US011649731B2

(12) United States Patent
Propheter-Hinckley et al.

(10) Patent No.: US 11,649,731 B2
(45) Date of Patent: *May 16, 2023

(54) AIRFOIL HAVING INTERNAL HYBRID COOLING CAVITIES

(71) Applicant: Raytheon Technologies Corporation, Farmington, CT (US)

(72) Inventors: Tracy A. Propheter-Hinckley, Manchester, CT (US); Carey Clum, East Hartford, CT (US); Timothy J. Jennings, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 387 days.

This patent is subject to a terminal disclaimer.

(21) Appl. No.: 16/811,249

(22) Filed: Mar. 6, 2020

(65) Prior Publication Data
US 2020/0291791 A1  Sep. 17, 2020

Related U.S. Application Data

(62) Division of application No. 15/723,473, filed on Oct. 3, 2017, now Pat. No. 10,626,734.

(51) Int. Cl.
*B22C 9/10* (2006.01)
*B22C 9/24* (2006.01)
(Continued)

(52) U.S. Cl.
CPC ................ *F01D 5/187* (2013.01); *B22C 9/10* (2013.01); *B22C 9/103* (2013.01); *B22C 9/24* (2013.01);
(Continued)

(58) Field of Classification Search
CPC .. B22C 9/10; B22C 9/103; B22C 9/24; F01D 5/186; F01D 5/187; F01D 25/12;
(Continued)

(56) References Cited

U.S. PATENT DOCUMENTS 3,111,302 A  11/1963 Bowmer
4,505,639 A   3/1985 Groess et al.
(Continued)

FOREIGN PATENT DOCUMENTS

EP  0475658 A1  3/1992
EP  2228517 A2  9/2010
(Continued)

OTHER PUBLICATIONS

European Office Action for European Application No. 18198427.9, International Filing Date Oct. 3, 2018, dated Jun. 26, 2020, 5 pages.
(Continued)

*Primary Examiner* — Kevin E Yoon
*Assistant Examiner* — Jacky Yuen
(74) *Attorney, Agent, or Firm* — Cantor Colburn LLP

(57) ABSTRACT

Airfoils bodies having a first core cavity and a second core cavity located within the airfoil body that is adjacent the first core cavity. The second core cavity is defined by a first cavity wall, a second cavity wall, a first exterior wall, and a second exterior wall, wherein the first cavity wall is located between the second core cavity and the first core cavity and the first and second exterior walls are exterior walls of the airfoil body. The first cavity wall includes a first surface angled toward the first exterior wall and a second surface angled toward the second exterior wall. At least one first cavity impingement hole is formed within the first surface and a central ridge extends into the second core cavity from at least one of the first cavity wall and the second wall and divides the second core cavity into a two-vortex chamber.

9 Claims, 18 Drawing Sheets

(51) Int. Cl.
  *F01D 5/18*   (2006.01)
  *F01D 9/04*   (2006.01)
  *F01D 25/12*  (2006.01)
  *F01D 9/06*   (2006.01)

(52) U.S. Cl.
  CPC ............ *F01D 9/041* (2013.01); *F01D 9/065* (2013.01); *F01D 25/12* (2013.01); *F01D 5/186* (2013.01); *F05D 2220/32* (2013.01); *F05D 2230/21* (2013.01); *F05D 2230/211* (2013.01); *F05D 2240/30* (2013.01); *F05D 2260/201* (2013.01); *F05D 2260/202* (2013.01); *F05D 2260/205* (2013.01); *F05D 2260/221* (2013.01)

(58) Field of Classification Search
  CPC .......... F05D 2230/21; F05D 2230/211; F05D 2260/201; F05D 2260/202; F05D 2260/221
  See application file for complete search history.

(56) References Cited

U.S. PATENT DOCUMENTS

| | | | |
|---|---|---|---|
| 5,193,980 | A | 3/1993 | Kaincz et al. |
| 5,246,340 | A | 9/1993 | Winstanley et al. |
| 5,259,730 | A | 11/1993 | Damlis et al. |
| 6,514,042 | B2 | 2/2003 | Kvasnak et al. |
| 6,609,884 | B2 | 8/2003 | Harvey |
| 6,629,817 | B2 | 10/2003 | Shelton et al. |
| 6,837,683 | B2 | 1/2005 | Dailey |
| 6,955,522 | B2 | 10/2005 | Cunha et al. |
| 7,011,502 | B2 | 3/2006 | Lee et al. |
| 7,063,506 | B2 | 6/2006 | Davison et al. |
| 7,131,818 | B2 | 11/2006 | Cunha et al. |
| 7,195,458 | B2 | 3/2007 | Liang |
| 7,413,407 | B2 | 8/2008 | Liang |
| 7,513,739 | B2 | 4/2009 | Boury et al. |
| 7,556,476 | B1 | 7/2009 | Liang |
| 7,985,049 | B1 | 7/2011 | Liang |
| 8,025,482 | B1 | 9/2011 | Liang |
| 8,052,389 | B2 | 11/2011 | Kopmels |
| 8,057,183 | B1 | 11/2011 | Liang |
| 8,231,349 | B2 | 7/2012 | Naik et al. |
| 8,297,927 | B1 | 10/2012 | Liang |
| 8,322,987 | B2 | 12/2012 | Webster et al. |
| 8,398,370 | B1 | 3/2013 | Liang |
| 8,523,523 | B2 | 9/2013 | Townes et al. |
| 8,657,576 | B2 | 2/2014 | Tibbott et al. |
| 8,864,469 | B1 | 10/2014 | Liang |
| 9,017,027 | B2 | 4/2015 | Campbell et al. |
| 9,022,737 | B2 | 5/2015 | Piggush et al. |
| 9,296,039 | B2 | 3/2016 | Propheter-Hinckley et al. |
| 9,394,798 | B2 | 7/2016 | Crites et al. |
| 2003/0133797 | A1 | 7/2003 | Dailey |
| 2005/0053459 | A1 | 3/2005 | Cunha et al. |
| 2005/0220626 | A1 | 10/2005 | Gray |
| 2005/0281675 | A1 | 12/2005 | Liang |
| 2006/0002795 | A1 | 1/2006 | Liang |
| 2006/0280607 | A1 | 12/2006 | Harvey et al. |
| 2007/0253815 | A1 | 11/2007 | Kopmels et al. |
| 2008/0080979 | A1 | 4/2008 | Brassfield et al. |
| 2008/0138209 | A1* | 6/2008 | Cunha ..................... F01D 5/187 416/97 R |
| 2009/0285683 | A1 | 11/2009 | Pietraszkiewicz et al. |
| 2010/0040480 | A1 | 2/2010 | Webster et al. |
| 2010/0232946 | A1 | 9/2010 | Propheter-Hinckley et al. |
| 2010/0239409 | A1 | 9/2010 | Draper |
| 2010/0239412 | A1 | 9/2010 | Draper |
| 2010/0254824 | A1 | 10/2010 | Naik et al. |
| 2010/0303635 | A1 | 12/2010 | Townes et al. |
| 2013/0017064 | A1 | 1/2013 | Naik et al. |
| 2015/0004001 | A1 | 1/2015 | Schneider et al. |
| 2015/0226069 | A1 | 8/2015 | Pearson et al. |
| 2015/0354372 | A1 | 12/2015 | Quach et al. |
| 2016/0115796 | A1 | 4/2016 | Taniguchi et al. |
| 2016/0201476 | A1 | 7/2016 | Bunker et al. |
| 2016/0273365 | A1 | 9/2016 | Slavens et al. |
| 2017/0167269 | A1 | 6/2017 | Itzel |
| 2017/0306764 | A1 | 10/2017 | Konitzer et al. |
| 2017/0328208 | A1 | 11/2017 | Bunker |
| 2017/0356295 | A1 | 12/2017 | Dyson et al. |
| 2019/0101006 | A1 | 4/2019 | Clum et al. |
| 2019/0101007 | A1 | 4/2019 | Propheter-Hinckley et al. |
| 2019/0101008 | A1 | 4/2019 | Propheter-Hinckley et al. |
| 2019/0101009 | A1 | 4/2019 | Propheter-Hinckley et al. |
| 2019/0101010 | A1 | 4/2019 | Propheter-Hinckley et al. |

FOREIGN PATENT DOCUMENTS

| | | |
|---|---|---|
| EP | 2258925 A2 | 12/2010 |
| EP | 3000970 A1 | 3/2016 |
| EP | 3015651 A1 | 5/2016 |
| EP | 3181822 A1 | 6/2017 |
| EP | 3208422 A1 | 8/2017 |
| EP | 3263838 A1 | 1/2018 |
| FR | 1276994 A | 11/1961 |
| JP | 61205301 A | 3/1985 |
| JP | 60135605 B2 | 7/1985 |
| JP | 2002242607 A | 2/2002 |
| WO | 2013139926 A1 | 9/2013 |
| WO | 2013163037 A1 | 10/2013 |
| WO | 2017074404 A1 | 5/2017 |

OTHER PUBLICATIONS

European Office Action for European Application No. 18198465.9, International Filing Date Oct. 30, 2018, dated Jun. 26, 2020, 4 pages.

European Office Action for European Application No. 18198478.2, International Filing Date Oct. 30, 2018, dated Aug. 21, 2020, 4 pages.

\* cited by examiner

AIRFOIL HAVING INTERNAL HYBRID COOLING CAVITIES

CROSS-REFERENCE TO RELATED APPLICATIONS

This application is a Division of the legally related U.S. patent application Ser. No. 15/723,473, filed Oct. 3, 2017. The content of the priority application is hereby incorporated by reference in its entirety.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, airfoils for gas turbine engines are provided. The airfoils include an airfoil body having a plurality of cavities formed therein, the airfoil extending in a radial direction between a first end and a second end, and extending axially between a leading edge and a trailing edge, a first core cavity within the airfoil body, and a second core cavity located within the airfoil body and adjacent the first core cavity, wherein the second core cavity is defined by a first cavity wall, a second cavity wall opposing the first cavity wall, a first exterior wall, and a second exterior wall opposing the first exterior wall, wherein the first cavity wall is located between the second core cavity and the first core cavity and the first and second exterior walls are exterior walls of the airfoil body. The first cavity wall includes a first surface angled toward the first exterior wall and a second surface angled toward the second exterior wall and at least one first cavity impingement hole is formed within the first surface, wherein a first impingement flow flows from the first core cavity through the at least one first cavity impingement hole and impinges upon the first exterior wall to form a first high momentum jet of impingement air thereon and a central ridge extending into the second core cavity from at least one of the first cavity wall and the second wall, wherein the central ridge at least partially divides the second core cavity into a two-vortex chamber.

In addition to one or more of the features described herein, or as an alternative, further embodiments of the airfoils may include that the central ridge is a forward central ridge extending into the second core cavity from the first cavity wall, the airfoil further comprising an aft central ridge extending into the second core cavity from the second cavity wall.

In addition to one or more of the features described herein, or as an alternative, further embodiments of the airfoils may include at least one second cavity impingement hole formed within the second surface, wherein a second impingement flow flows from the first core cavity through the at least one second cavity impingement hole and impinges upon the second exterior wall to form a second high momentum jet thereon.

In addition to one or more of the features described herein, or as an alternative, further embodiments of the airfoils may include that the first impingement flow separates into the first high momentum jet flowing along the first exterior wall and a first portion of a radial cooling flow within the second core cavity and the second impingement flow separates into the second high momentum jet flowing along the second exterior wall and a second portion of the radial cooling flow within the second core cavity, wherein the first and second portions of the radial cooling flow flow radially within the two-vortex chamber.

In addition to one or more of the features described herein, or as an alternative, further embodiments of the airfoils may include at least one circuit exit in the first exterior wall, the at least one circuit exit arranged to expel air from the second core cavity through the first exterior wall.

In addition to one or more of the features described herein, or as an alternative, further embodiments of the airfoils may include a funneling feature extending the second core cavity along the first exterior wall to the at least one circuit exit.

In addition to one or more of the features described herein, or as an alternative, further embodiments of the airfoils may include at least one heat transfer augmentation feature within the at least one circuit exit.

In addition to one or more of the features described herein, or as an alternative, further embodiments of the airfoils may include at least one film exit in the first exterior wall, the at least one film exit arranged to expel air from the second core cavity through the first exterior wall.

In addition to one or more of the features described herein, or as an alternative, further embodiments of the airfoils may include a funneling feature extending the second core cavity along the first exterior wall to the at least one circuit exit.

In addition to one or more of the features described herein, or as an alternative, further embodiments of the airfoils may include that the at least one first cavity impingement hole has one of a radial orientation, an axial orientation, or an angular orientation within the first cavity wall.

According to some embodiments, core structures for manufacturing airfoils for gas turbine engines are provided. The core structures include a first core cavity core to form a first core cavity and a second core cavity core to form a second core cavity, the second core cavity core located adjacent the first core cavity core, wherein the second core cavity core is arranged to form a first cavity wall, a second cavity wall opposing the first cavity wall, a first exterior wall, and a second exterior wall opposing the first exterior wall in a formed airfoil body such that the first cavity wall is located between the second core cavity core and the first core cavity and the first and second exterior walls are exterior walls of the formed airfoil body. A space between the first core cavity core and the second core cavity core that defines the first cavity wall includes a first portion to form a first surface of the first cavity wall that is angled toward the formed first exterior wall and a second portion to form a second surface of the first cavity wall that is angled toward the formed second exterior wall. At least one first cavity impingement stem extends between the first core cavity core and the second core cavity core, wherein at least one first cavity impingement hole is formed thereby in a formed airfoil body such that cooling flow can flow from the first core cavity through the at least one first cavity impingement hole and impinge upon the first exterior wall of the formed airfoil body to form a first high momentum jet of impingement air thereon. A central channel is formed in the second core cavity core extending into the second core cavity core to form a central ridge on at least one of the first cavity wall and the second cavity wall, wherein the central ridge at least partially divides the second core cavity into a two-vortex chamber.

In addition to one or more of the features described herein, or as an alternative, further embodiments of the core structures may include at least one second cavity impingement stem extending between the first core cavity core and the second core cavity core, wherein at least one second cavity impingement hole is formed thereby in a formed airfoil body such that cooling flow can flow from the first core cavity through the at least one second cavity impingement hole and impinge upon the second exterior wall of the formed airfoil body to form a second high momentum jet thereon.

In addition to one or more of the features described herein, or as an alternative, further embodiments of the core structures may include at least one film exit stem attached to the second core cavity core to form at least one film exit in the first exterior wall, the at least one film exit arranged to expel air from the second core cavity through the first exterior wall in the formed airfoil body.

In addition to one or more of the features described herein, or as an alternative, further embodiments of the core structures may include that the at least one formed film exit is arranged to pull the impingement air from the at least one first cavity impingement hole along an interior surface of the first exterior wall within the second core cavity of the formed airfoil.

In addition to one or more of the features described herein, or as an alternative, further embodiments of the core structures may include at least one film exit core attached to the second core cavity core to form at least one circuit exit in the first exterior wall, the at least one circuit exit arranged to expel air from the second core cavity through the first exterior wall in the formed airfoil body.

In addition to one or more of the features described herein, or as an alternative, further embodiments of the core structures may include that the at least one film exit core includes one or more heat transfer augmentation core features therein to form heat transfer augmentation features in the at least one circuit exit.

In addition to one or more of the features described herein, or as an alternative, further embodiments of the core structures may include that the central channel is a forward central channel extending into the second core cavity core to form a forward central ridge in a formed airfoil, the core structure further comprising an aft central channel extending into the second core cavity to form an aft central ridge in the formed airfoil.

In addition to one or more of the features described herein, or as an alternative, further embodiments of the core structures may include a funnel feature extension extending from the second core cavity core in an aftward direction to form a funneling feature in a formed airfoil.

In addition to one or more of the features described herein, or as an alternative, further embodiments of the core structures may include that the at least one first cavity impingement stem is oblong in shape and has one of a radial orientation, an axial orientation, or an angular orientation.

According to some embodiments, gas turbine engines are provided. The gas turbine engines include an airfoil having an airfoil body having a plurality of cavities formed therein, the airfoil extending in a radial direction between a first end and a second end, and extending axially between a leading edge and a trailing edge, a first core cavity within the airfoil body, and a second core cavity located within the airfoil body and adjacent the first core cavity, wherein the second core cavity is defined by a first cavity wall, a second cavity wall opposing the first cavity wall, a first exterior wall, and a second exterior wall opposing the first exterior wall, wherein the first cavity wall is located between the second core cavity and the first core cavity and the first and second exterior walls are exterior walls of the airfoil body. The first cavity wall includes a first surface angled toward the first exterior wall and a second surface angled toward the second exterior wall. At least one first cavity impingement hole is formed within the first surface, wherein a first impingement flow flows from the first core cavity through the at least one first cavity impingement hole and impinges upon the first exterior wall to form a first high momentum jet of impingement air thereon. A central ridge extends into the second core cavity from at least one of the first cavity wall and the second wall, wherein the central ridge at least partially divides the second core cavity into a two-vortex chamber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
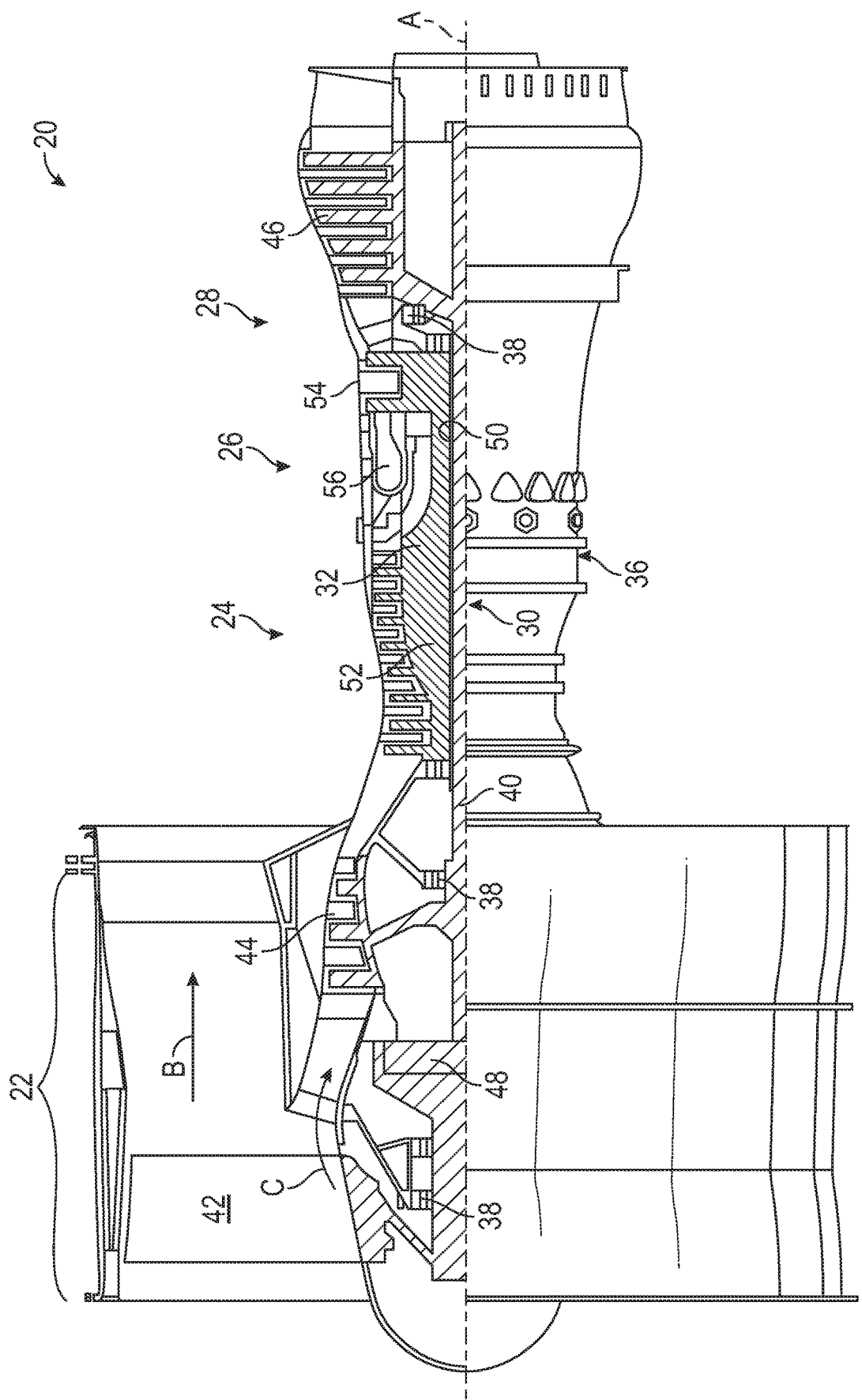
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(514.7° R)]0.5. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
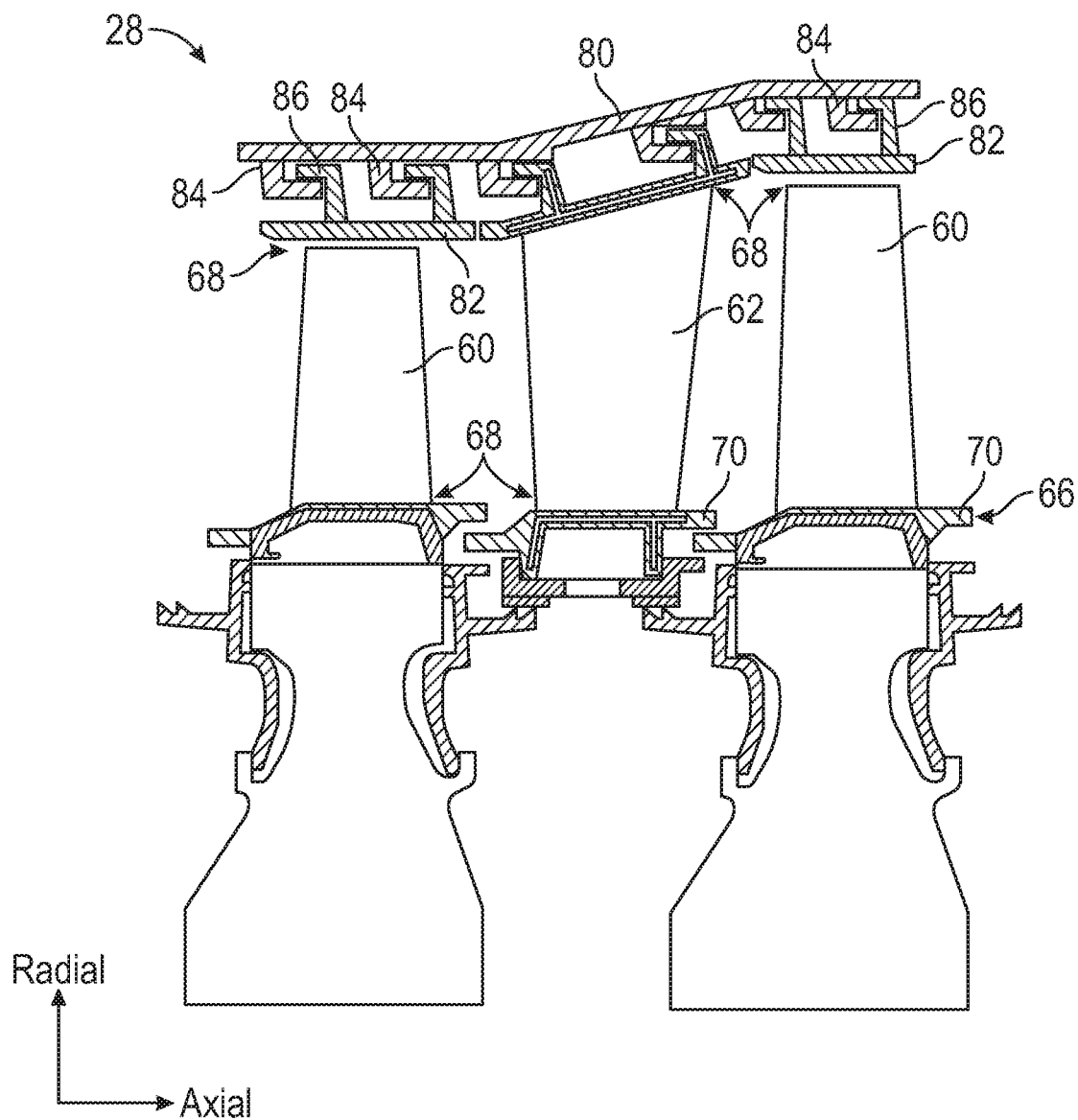
FIG. 2 is a schematic illustration of a portion of a turbine section of the gas turbine engine of FIG. 1.

FIG. 2 is a schematic view of a portion of the turbine section 28 that may employ various embodiments disclosed herein. Turbine section 28 includes a plurality of airfoils 60, 62 including, for example, one or more blades and vanes. The airfoils 60, 62 may be hollow bodies with internal cavities defining a number of channels or cores, hereinafter airfoil cores, formed therein and extending from an inner diameter 66 to an outer diameter 68, or vice-versa. The airfoil cores may be separated by partitions within the airfoils 60, 62 that may extend either from the inner diameter 66 or the outer diameter 68 of the airfoil 60, 62. The partitions may extend for a portion of the length of the airfoil 60, 62, but may stop or end prior to forming a complete wall within the airfoil 60, 62. Thus, each of the airfoil cores may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis) may be airflow ports and/or bleed orifices that enable air to bleed from the internal cavities of the airfoils 60, 62. A root of the airfoil may connect to or be part of the platform 70.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

As shown and labeled in FIG. 2, a radial direction is upward on the page (e.g., radial with respect to an engine axis) and an axial direction is to the right on the page (e.g., along an engine axis). Thus, radial cooling flows will travel up or down on the page and axial flows will travel left-to-right (or vice versa).

Figure 3:
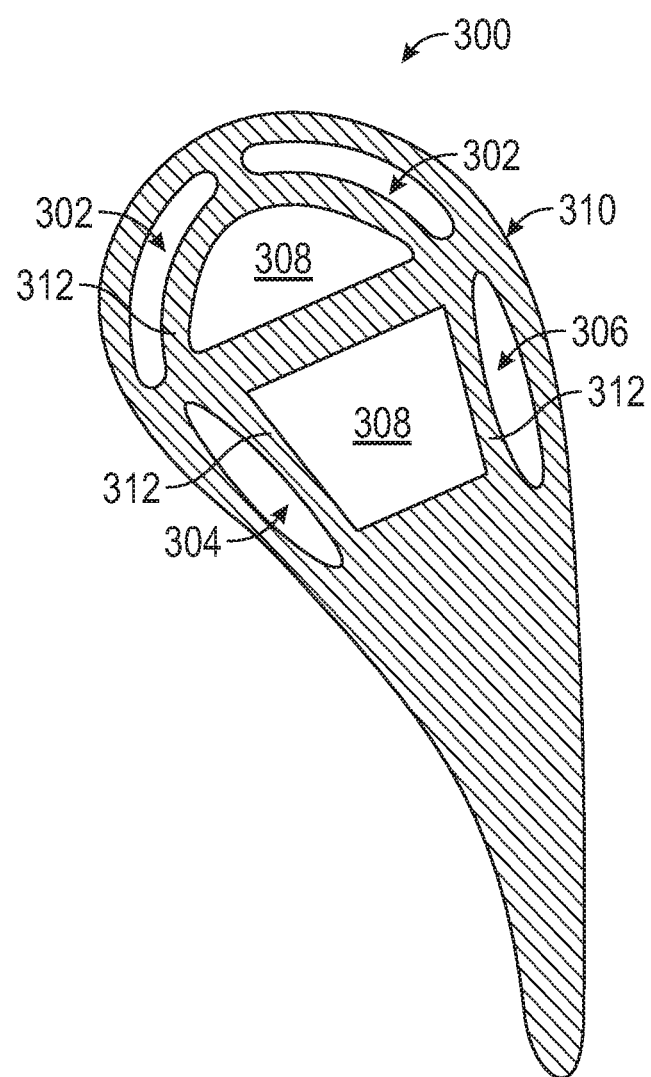
FIG. 3 is a schematic illustration of a hybrid cavity configuration of an airfoil.

Turning to FIG. 3, an airfoil 300 having internal hybrid cavities is shown. As used herein, a "hybrid cavity" is an internal cavity of an airfoil that has one wall that is a hot wall (e.g., exterior surface of an airfoil body and exposed to hot, gaspath air) and another wall that is a cold wall (e.g., a wall that is not exposed to the hot gaspath air, and may be an internal or interior wall structure of the airfoil). For example, as shown in FIG. 3, the airfoil 300 has a two leading edge hybrid cavities 302, a pressure side hybrid cavity 304, and a suction side hybrid cavity 306.

The hybrid cavities 302, 304, 306 are defined in the airfoil 300 with a first wall of the hybrid cavity defined by an exterior surface wall 310 of the airfoil 300. The exterior surface wall 310 is a "hot" wall of the airfoil 300 that is exposed to hot, gaspath air. A second wall of the hybrid cavity is defined by an interior wall 312, with the interior wall 312 being a "cold" wall of the airfoil 300. A cold wall is one that is not exposed to the hot gaspath air, and thus remains relatively cool in comparison to the hot, exterior surface walls. For example, the interior walls 312 can be adjacent to or part of defining walls of internal, cold core cavities 308.

Embodiments described herein are directed to eliminating the need for the interior wall to define the hybrid cavities. For example, in some embodiments, the elimination of the interior cold wall(s) is achieved by connecting a first core cavity to a second core cavity with a double impingement rib along the edges of the second core cavity. The double impingement rib directs air from the first core cavity to the second core cavity along an external hot wall of the second core cavity. Further, one or more sets of film holes are arranged along the external hot wall of the second core cavity to directionally pull the air along the external hot wall, thus generating a high momentum jet along an interior surface of the external hot wall within the second core cavity. The high momentum jet within the second core cavity creates a flow field that rides along the external hot wall and creates a "dead zone" in the middle of the second core cavity. The "dead zone" is an area or region of the second core cavity that is not directly influenced by the impingement cooling from the first core cavity and enables a radial cooling flow to pass through the middle of the second core cavity. Advantageously, embodiments provided herein enable the benefits of a hybrid cavity without the added weight of a conventional hybrid cavity geometry (e.g., employing the interior cold wall).

Figure 4B:
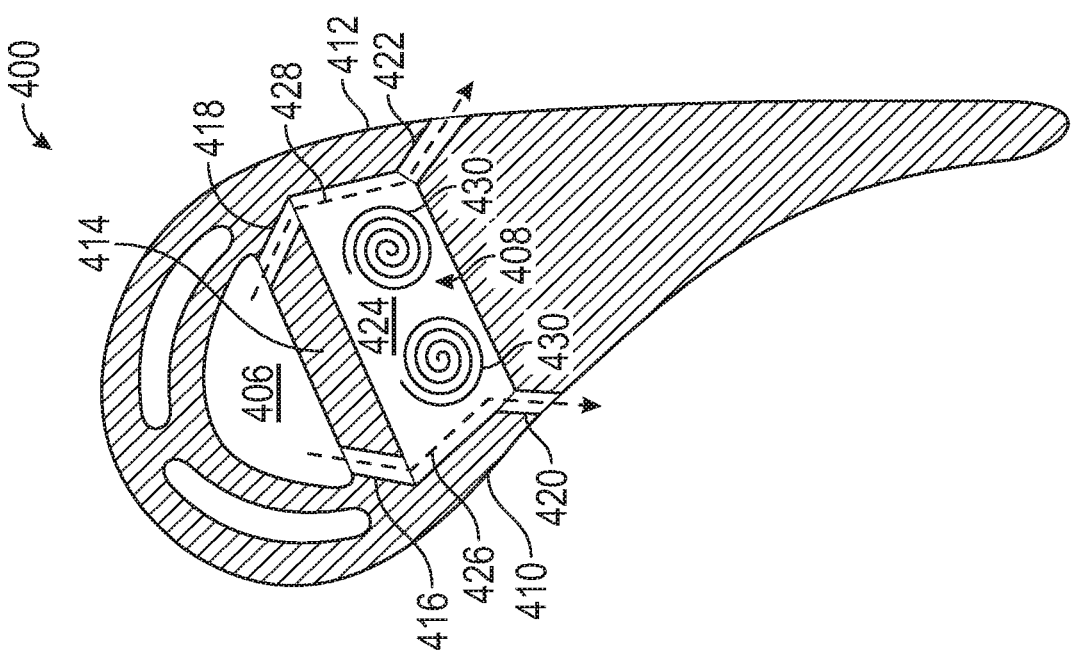
FIG. 4B is a schematic illustration of airflow through the airfoil of FIG. 4A.
Figure 4A:
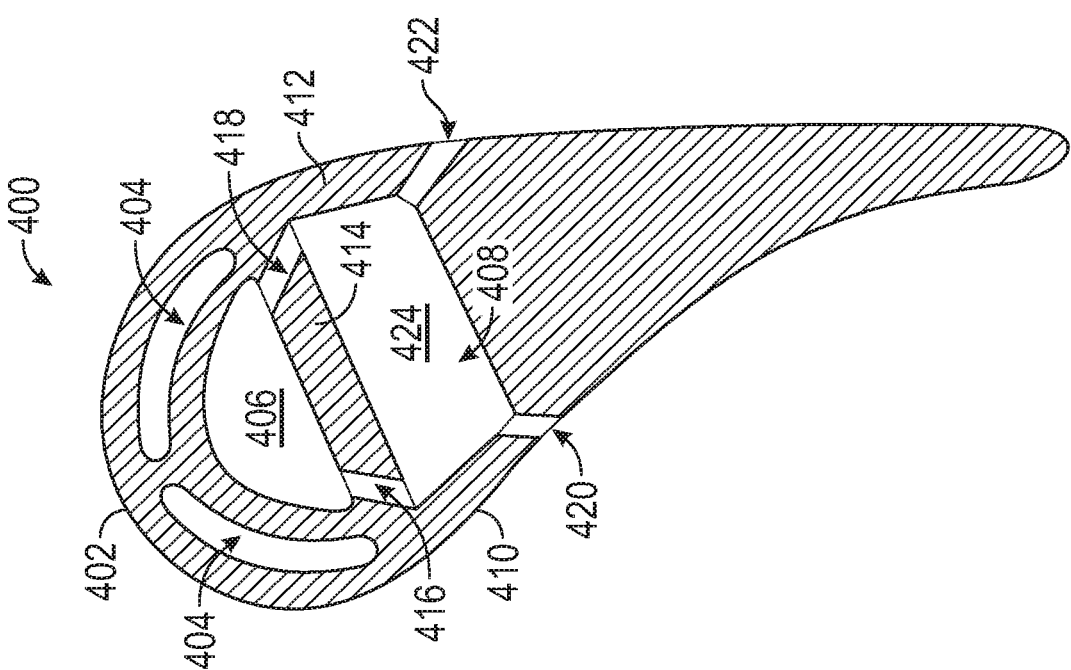
FIG. 4A is a schematic illustration of a cavity configuration of an airfoil in accordance with an embodiment of the present disclosure.

For example, turning to FIGS. 4A-4B, schematic illustrations of an airfoil 400 in accordance with an embodiment of the present disclosure shown. FIG. 4A illustrates the structure of the airfoil 400 and FIG. 4B illustrates a portion of an airflow through the airfoil 400. In this embodiment, a leading edge 402 of the airfoil 400 is arranged with two leading edge hybrid cavities 404. The cold walls of the leading edge hybrid cavities 404 is defined by a first core cavity 406. As shown, the first core cavity 406 is a typical cold, internal cavity, similar to that shown in FIG. 3. Aft of the first core cavity 406 is a second core cavity 408. The second core cavity 408, as shown, is not a hybrid cavity, but rather has two opposing exterior walls 410, 412. A first exterior wall 410 of the second core cavity 408 is a hot wall on a pressure side of the airfoil 400 and a second exterior wall 412 of the second core cavity 408 is a hot wall on a suction side of the airfoil 400. The first core cavity 406 and the second core cavity 408 are divided or separated by an impingement rib 414.

The impingement rib 414 includes a first set of impingement holes 416 and a second set of impingement holes 418. The first and second sets of impingement holes 416, 418 are arranged to fluidly connect the first core cavity 406 to the second core cavity 408 and to direct impingement air from the first core cavity 406 into the second core cavity 408 along the exterior walls 410, 412. The impinging air from the first core cavity 406 into the second core cavity 408 is achieved due to a pressure differential between the first and second core cavities 406, 408. The first core cavity 408 has relatively high air pressure therein. The high air pressure is due to a fed of cooling air supplied into the first core cavity 406, such as from a platform, inner diameter source, outer diameter source, etc. as will be appreciated by those of skill in the art. The second core cavity 408 has relatively low air pressure, which may be a result of a restricted cooling flow, or an absence of a supplied cooling flow directly into the second core cavity 408. The difference in pressure causes the air from the first core cavity 406 to flow into the second core cavity 408 through the impingement holes 416, 418. In a blade configuration, for example, the first core cavity 406 may be sourced from a root region and the second core 408 may be closed off from being sourced from the root region (e.g., completely sealed, blocked by a metering plate or other structure, etc.), thus resulting in a differential pressure between the first and second core cavities 406, 408. In embodiments where the second core cavity 408 is completely sealed, all cooling air within the second core cavity 408 can be sourced from the first cooling cavity 406. In a vane configuration, for example, the first and second core cavities 406, 408 could have two different sources with two different air pressures to achieve a desired differential pressure to achieve the impingement from the first core cavity 406 into the second core cavity 408.

As shown in FIGS. 4A-4B, the first set of impingement holes 416 are angled to direct impingement air from the first core cavity 406 at the first exterior wall 410 within the second core cavity 408. Similarly, the second set of impingement holes 418 are angled to direct impingement air from the first core cavity 406 at the second exterior wall 412 within the second core cavity 408. The impinging air forms a high momentum jet of air along the interior surfaces of the exterior walls 410, 412 thus isolating an internal dead zone 424, as shown and described herein. The second core cavity 408 has a first film exit 420 on the first exterior wall 410 that enables a portion of a flow to pass from the second core cavity 408 to the exterior of the airfoil 400, such as out along a pressure side wall exterior surface of the airfoil 400. The second core cavity 408, as shown, also includes a second film exit 422 on the second exterior wall 412 that enables a portion of a flow to pass from the second core cavity 408 to the exterior of the airfoil 400, such as out along a suction side wall exterior surface of the airfoil 400.

With reference to FIG. 4B, a schematic illustration of an airflow through the airfoil 400 is shown. A first side cooling flow 426 originates within the first core cavity 406, flows through the first set of impingement holes 416 in the impingement rib 414 into the second core cavity 408 along the first exterior wall 410. Similarly, a second side cooling flow 428 originates within the first core cavity 406, flows through the second set of impingement holes 418 in the impingement rib 414 into the second core cavity 408 along the second exterior wall 412. The first side cooling flow 426 is drawn through the second core cavity 408 along the first exterior wall 410 by the pull of airflow through the first film exit 420. Similarly, the second side cooling flow 428 is drawn through the second core cavity 408 along the second exterior wall 412 by the pull of airflow through the second film exit 422.

As shown in FIG. 4B, the first and second side cooling flows 426, 428 create a dead zone 424 within the second core cavity 408. The first and second sets of impingement holes 416, 418 include impingement holes that are configured to enable high velocity, high momentum side cooling flows 426, 428 to be formed as a high momentum jet along the interior surfaces of the first and second exterior side walls 410, 412 of the second core cavity 408. The high velocity, high momentum jet flow of the side cooling flows 426, 428 can isolate the dead zone 424 from the hot surfaces of the exterior side walls 410, 412, thus preventing high thermal transfer from the material of the airfoil 400 into the dead zone 424.

As shown, a radial cooling flow 430 passes through the second core cavity 408 along the interior surface of the exterior side walls 410, 412. The radial cooling flow 430 may be a typical cooling flow passing from one end of an airfoil (or cavity) to another end of the airfoil (or cavity). The radial cooling flow 430 can flow in either direction, e.g., radially outward toward an outer diameter or radially inward toward an inner diameter. For example, in some embodiments, the radial cooling flow 430 can flow from a root or first end of the airfoil 400 to a tip or second end of the airfoil 400. In some embodiments, the radial cooling flow 430 is entirely formed from a portion of the air flowing through the first and second sets of impingement holes 416, 418 (e.g., from the first core cavity 406). In other embodiments, a portion of the radial cooling flow 430 can be sourced from a root or tip region and/or from other internal cavities of the airfoil (although the pressure within the second cavity core 408 will still be less than that within the first cavity core 408).

The radial cooling flow 430 may have low MACH numbers, slow flow, and low momentum. As illustratively shown, a portion of the radial cooling flow 430 may be rotated or swirled by the flow of the side cooling flows 426, 428. For example, in some arrangements, the side cooling flows 426, 428 can cause dynamic vortices to be generated within the second core cavity 408, with the dynamic vortices operating to contain the side cooling flows 426, 428 against the exterior walls 410, 412 (e.g., compress/push the high momentum jet air of the side cooling flows 426, 428 against the exterior walls 410, 412) and/or to contain and channel the radial cooling flow 430 within the dead zone 424 of the second core cavity 408.

Figure 5A:
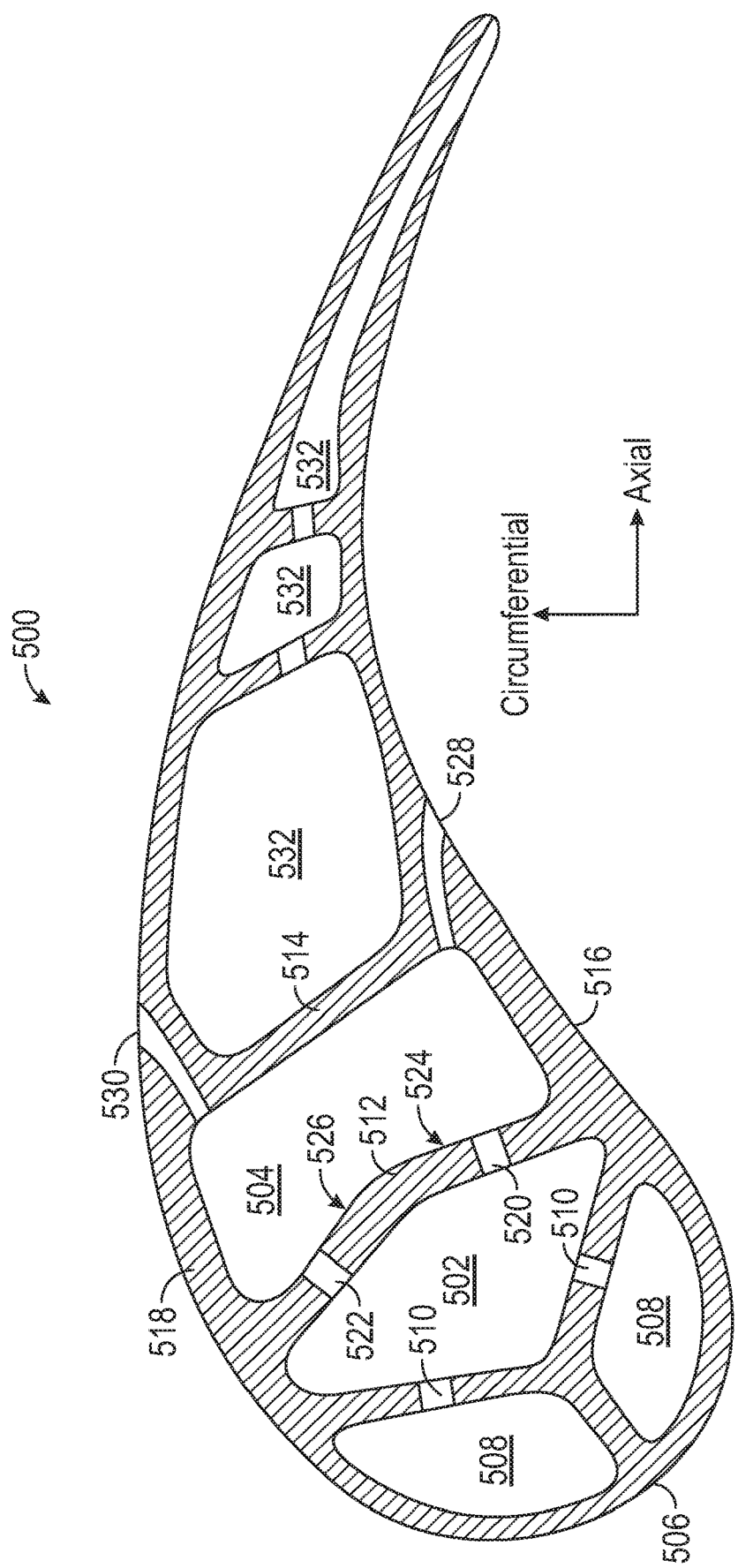
FIG. 5A is a top down plan view cross-section illustration of internal cavities of an airfoil in accordance with an embodiment of the present disclosure.
Figure 5B:
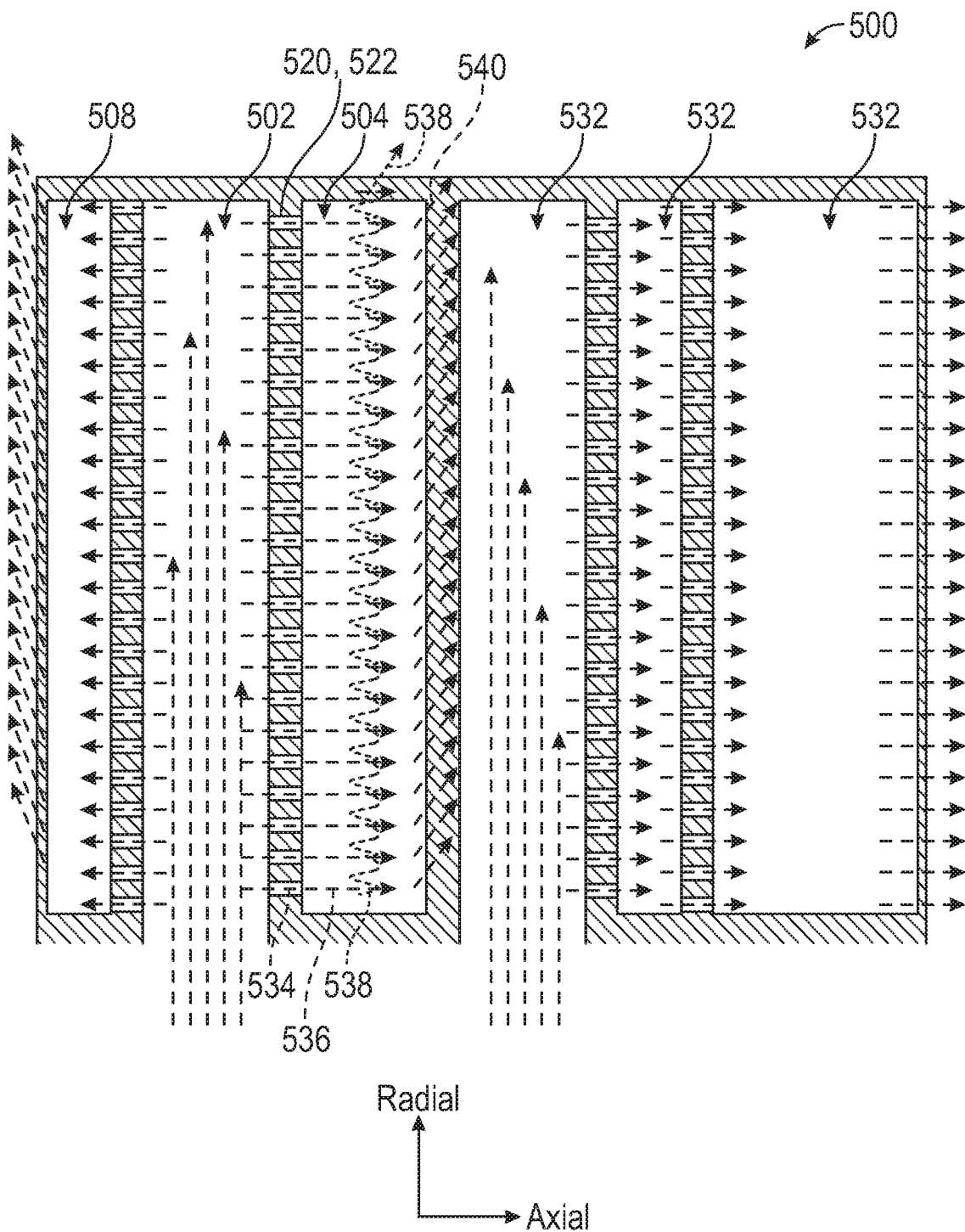
FIG. 5B is a side elevation cross-section illustrating the internal cavities of the airfoil of FIG. 5A and illustrating air flow flowing therein.

Turning now to FIGS. 5A-5B, schematic illustrations of an airfoil 500 in accordance with an embodiment of the present disclosure are shown. FIG. 5A is a top down plan view cross-section illustrating the internal cavities of the airfoil 500 and FIG. 5B is a side elevation cross-section illustrating the internal cavities of the airfoil 500 illustrating air flow flowing therein. The airfoil 500 includes a first core cavity 502 and a second core cavity 504 having an arrangement similar to that described above, wherein side cooling flows are generated by airflow that flows from the first core cavity 502 along interior side walls of the second core cavity 504 and then is expelled out of the airfoil 500.

An interior of the airfoil 500, at a leading edge 506, is divided into multiple leading edge hybrid cavities 508. Although shown with two leading edge hybrid cavities 508, various embodiments may have any number of leading edge hybrid or non-hybrid, core cavities, including a single leading edge cavity (hybrid or core cavity). The leading edge hybrid cavities 508 are arranged as leading-edge impingement cavities that are supplied with impingement air from the first core cavity 502 through one or more forward impingement holes 510. The impinging air from the first core cavity 502 into the leading edge hybrid cavities 508 allows for changes in pressure distribution across the leading edge 506 of the airfoil 500 without causing back flow margin issues. The leading edge hybrid cavities 508 are fed from the first core cavity 502, which may be a leading edge feed cavity which also feeds the second core cavity 504, in a manner similar to that described above.

The second core cavity 504 is defined in an axial direction between a first cavity wall 512 and a second cavity wall 514. In a circumferential direction, the second core cavity 504 is defined by a first exterior wall 516 and an opposing second exterior wall 518. As discussed above, the exterior walls 516, 518 of the second core cavity 504 are "hot" walls that are exposed to hot gaspath air. In this embodiment, the first cavity wall 512 and the second cavity wall 514 are "cold" walls that are not exposed to the hot gaspath air (i.e., they are internal walls). The first cavity wall 512 includes one or more cavity impingement holes 520, 522. In this embodiment, a first set of cavity impingement holes 520 is positioned and oriented within the first cavity wall 512 to direct an aft-flowing impingement flow from the first core cavity 502 into the second core cavity 504 and at the first exterior side wall 516. Similarly, a second set of cavity impingement holes 522 is positioned and oriented within the first cavity wall 512 to direct an aft-flowing impingement flow from the first core cavity 502 into the second core cavity 504 and at the second exterior side wall 518.

As shown, part of the directing of the impinging flow from the first core cavity 502 to the second core cavity 504 is achieved by the first cavity wall 512 being contoured or shaped. In the present embodiment, the first cavity wall 512 has a first surface 524 that is angled or faces the first exterior wall 516. Similarly, the first cavity wall 512 has a second surface 526 that is angled or faces the second exterior wall 518. Although the first cavity wall 512 has a specific geometric shape (e.g., shown as a chevron shape extending into the second core cavity 504) the geometry, shape, orientation, etc. of the first cavity wall 512 can be varied without departing from the scope of the present disclosure. For example, in some alternative arrangements, the first cavity wall may be arcuate or curved in a smooth transition from one side of the airfoil to the other, with angled surfaces facing the respective exterior walls.

In addition to the first cavity wall 512 having angled surfaces 524, 526, in some embodiments, the cavity impingement holes 520, 522 may be angled such that the air is forced to imping upon the exterior walls 516, 518 of the second core cavity 508. After the air from the first core cavity 502 impinges upon the exterior walls 516, 518 at least a portion of the air will form a high momentum jet along the exterior walls 516, 518 and flow out of the second core cavity 504 through film exits 528, 530. For example, air flowing through the first cavity impingement hole 520 will contact the interior surface of the first exterior wall 516 and run along the first exterior wall 516 to one or more first film exits 528, where the air will exit the interior of the airfoil 500 and flow along and exterior surface of the airfoil 500 (e.g., along a pressure side exterior surface). Similarly, air flowing through the second cavity impingement hole 522 will contact the interior surface of the second exterior wall 518 and run along the second exterior wall 518 to one or more second film exits 530, where the air will exit the interior of the airfoil 500 and flow along and exterior surface of the airfoil 500 (e.g., along a suction side exterior surface). The flow of the impingement air along the exterior walls 516, 518 causes a dead zone to form within the middle of the second core cavity 504, as shown and described above.

As shown in FIG. 5B, impingement air 534 flows from the first core cavity 502 into the second core cavity 504 through the cavity impingement holes 520, 522. The impingement air 534 divides into high momentum jet air 536 that flows along the exterior walls 516, 518 and a radial cooling flow 538 within the second core cavity 504. The high momentum jet air 536 is a film that flows along the exterior walls 516, 518 and out through the film exits 528, 530 as film air 540 that will flow along an exterior surface of the airfoil 500 (e.g., within a hot gaspath). The radial cooling flow 538 will have a low momentum and/or velocity within and around the dead zone (e.g., as shown in FIG. 4B) that is within the second core cavity 504. The radial cooling flow 538 can form into a dynamic vortex within the second core cavity 504. That is, the radial cooling flow 538 portion of the impingement air 534 may rotate within the dead zone of the cavity due to, in part, the high momentum jet air 536. The dynamic vortex structure of the radially cooling flow 538 may push the high momentum jet air 536 against the exterior walls 516, 518 and thus increase turbulence and, therefore, heat transfer within the second core cavity 504.

As shown in FIGS. 5A-5B, the airfoil 500 can include additional cooling cavities 532 located throughout the interior of the airfoil 500. The additional cooling cavities 532 can be parts of serpentine cavities, trailing edge cavities, flag tip cavities, or other cooling cavities (hybrid or non-hybrid (e.g., core) cavities).

Figure 6:
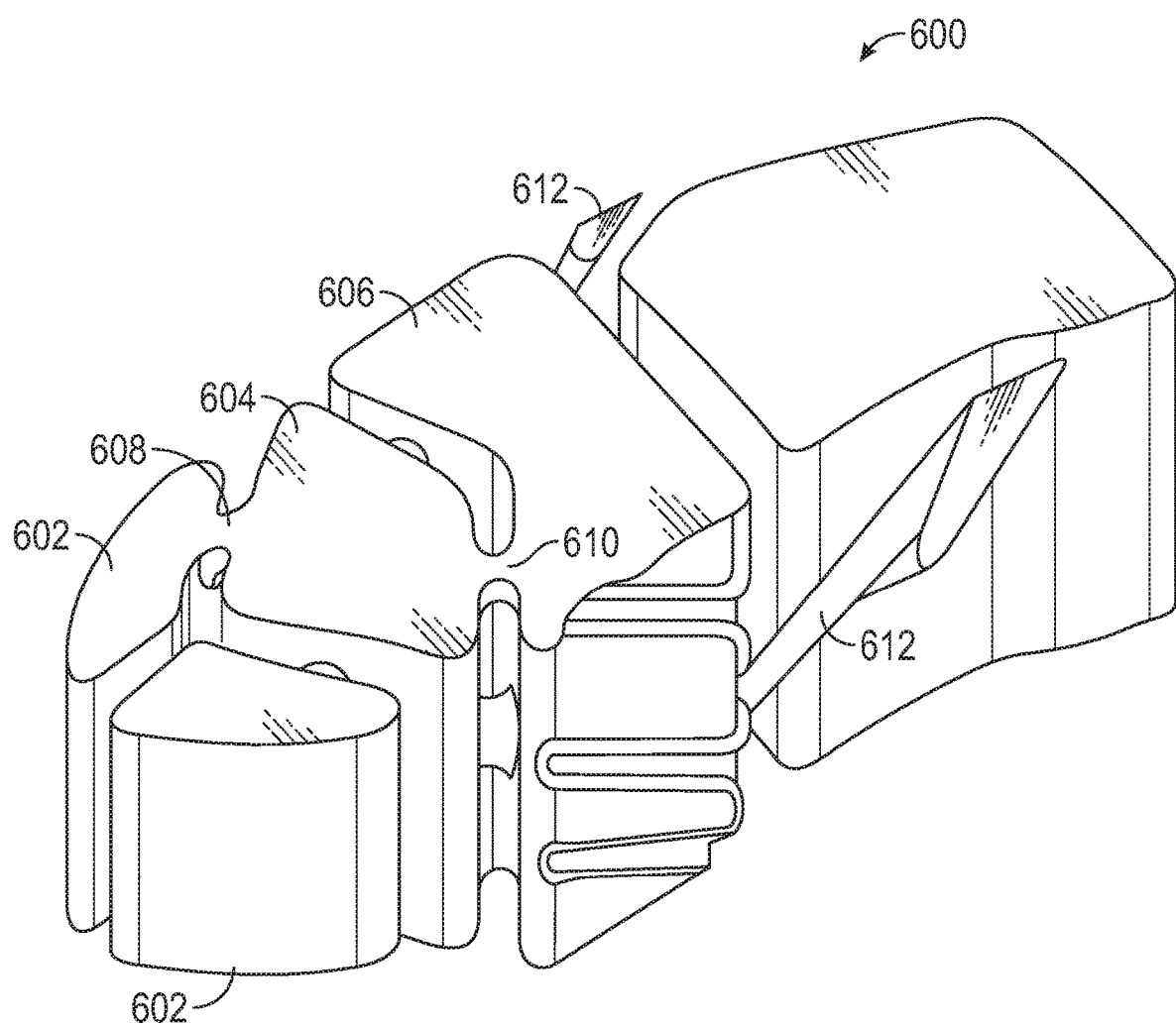
FIG. 6 is a schematic illustration of a portion of a core structure for forming an airfoil in accordance with an embodiment of the present disclosure.

Turning now to FIG. 6, a schematic illustration of a portion of an airfoil core structure 600 in accordance with an embodiment of the present disclosure is shown. The airfoil core structure 600 can be used to manufacture airfoils in accordance with the present disclosure. The airfoil core structure 600 includes a plurality of core bodies that are arranged to form cavities within an airfoil body (e.g., as shown and described above). For example, the airfoil core structure 600 includes two leading edge hybrid cavity cores 602, a first core cavity core 604, and a second core cavity core 606. The leading edge hybrid cavity cores 602 are connected to the forward core cavity core 604 by one or more forward impingement stems 608 that are arranged to form impingement holes between a formed first core cavity (from the first core cavity core 604) and formed leading edge hybrid cavities (from the leading edge hybrid cavity cores 602). Similarly, one or more cavity impingement stems 610 connect the first core cavity core 604 with the second core cavity core 606 to form impingement holes between a formed first core cavity and a formed second core cavity, as shown and described above.

The first core cavity core 604 is arranged with a geometry to form a first cavity wall of a formed second core cavity with a first surface and a second surface, as shown and described above. The first and second surfaces are arranged with the cavity impingement stems 610 to connect with the second core cavity core 606. Extending from or attached to the second core cavity core 606 are one or more film exit stems 612 that are arranged to form the film exits as shown and described above. In some embodiments, rather than using stems 612, the film exits can be drilled holes.

Although the airfoil core structure 600 is shown with a specific arrangement and geometry, those of skill in the art will appreciate that alternative arrangements are possible without departing from the scope of the present disclosure.

For example, in some embodiments, the film exits can be formed using refractory metal core structures that are integrally formed with or attached to the second core cavity core 606. Further, in some embodiments, manufacturing can be achieved using additive manufacturing techniques.

Figure 7:
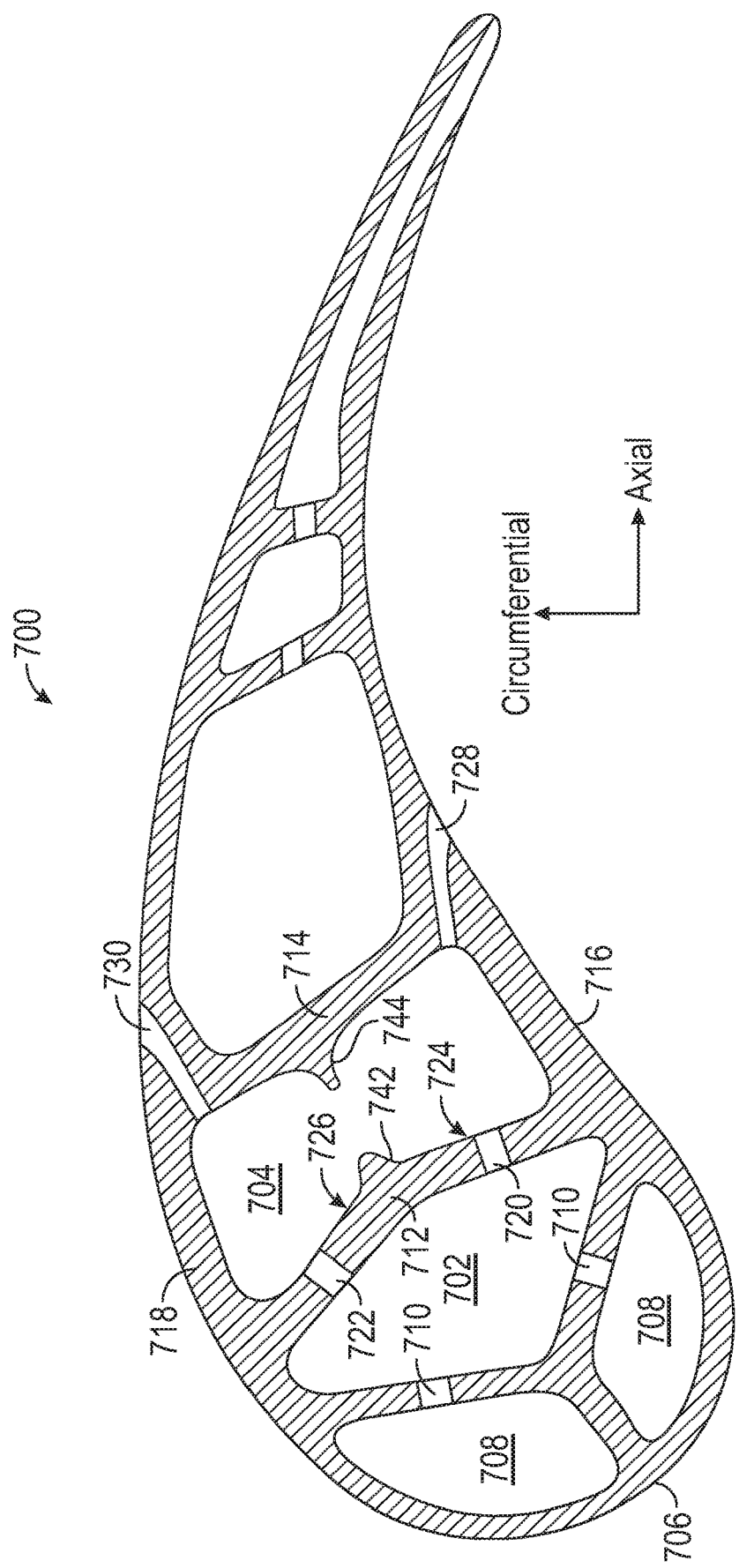
FIG. 7 is a schematic illustration of a cross-section of an airfoil in accordance with an embodiment of the present disclosure.

Turning now to FIG. 7, a schematic illustration of an airfoil 700 in accordance with an embodiment of the present disclosure is shown. The airfoil 700 includes a first core cavity 702 and a second core cavity 704 having an arrangement similar to that described above, wherein side cooling flows are generated by airflow that flows from the first core cavity 702 along interior side walls of the second core cavity 704 and then is expelled out of the airfoil 700.

As shown, the interior of the airfoil 700, at a leading edge 706, is divided into multiple leading edge hybrid cavities 708. The leading edge hybrid cavities 708 are arranged as leading-edge impingement cavities that are supplied with impingement air from the first core cavity 702 through one or more forward impingement holes 710. The leading edge hybrid cavities 708 are fed from the first core cavity 702, which may be a leading edge feed cavity which also feeds the second core cavity 704, in a manner similar to that described above.

The second core cavity 704 is defined in an axial direction between a first cavity wall 712 and a second cavity wall 714. In a circumferential direction, the second core cavity 704 is defined by a first exterior wall 716 and an opposing second exterior wall 718. As discussed above, the exterior walls 716, 718 of the second core cavity 704 are "hot" walls that are exposed to hot gaspath air, and the first cavity wall 712 and the second cavity wall 714 are "cold" walls that are not exposed to the hot gaspath air (i.e., they are internal walls). The first cavity wall 712 includes one or more cavity impingement holes 720, 722. A first set of cavity impingement holes 720 is positioned and oriented within the first cavity wall 712 to direct an aft-flowing impingement flow from the first core cavity 702 into the second core cavity 704 and at the first exterior side wall 716. A second set of cavity impingement holes 722 is positioned and oriented within the first cavity wall 712 to direct an aft-flowing impingement flow from the first core cavity 702 into the second core cavity 704 and at the second exterior side wall 718.

As shown, part of the directing of the impinging flow from the first core cavity 702 to the second core cavity 704 is achieved by the first cavity wall 712 being contoured or shaped. In the present embodiment, the first cavity wall 712 has a first surface 724 that is angled or faces the first exterior wall 716. Similarly, the first cavity wall 712 has a second surface 726 that is angled or faces the second exterior wall 718. In addition to the first cavity wall 712 having angled surfaces 724, 726, in some embodiments, the cavity impingement holes 720, 722 may be angled such that the air is forced to imping upon the exterior walls 716, 718 of the second core cavity 708. After the air from the first core cavity 702 impinges upon the exterior walls 716, 718 at least a portion of the air will form a high momentum jet along the exterior walls 716, 718 and flow out of the second core cavity 704 through film exits 728, 730. For example, air flowing through the first cavity impingement hole 720 will contact the interior surface of the first exterior wall 716 and run along the first exterior wall 716 to one or more first film exits 728, where the air will exit the interior of the airfoil 700 and flow along and exterior surface of the airfoil 700 (e.g., along a pressure side exterior surface). Similarly, air flowing through the second cavity impingement hole 722 will contact the interior surface of the second exterior wall 718 and run along the second exterior wall 718 to one or more second film exits 730, where the air will exit the interior of the airfoil 700 and flow along and exterior surface of the airfoil 700 (e.g., along a suction side exterior surface). The flow of the impingement air along the exterior walls 716, 718 causes a dead zone to form within the middle of the second core cavity 704, as shown and described above.

In the airfoil 700 shown in FIG. 7, the first cavity wall 712 and the second cavity wall 714 each include a central ridge. For example, as shown, a forward central ridge 742 is formed as part of or integral with the first cavity wall 712. The forward central ridge extends aftward into the second core cavity 704 toward the second cavity wall 714. Similarly, an aft central ridge 744 is formed as part of or integral with the second cavity wall 714. The aft central ridge 744 extends forward into the second core cavity 704 toward the first cavity wall 712. The central ridges 742, 744 do not extend entirely across the second core cavity 704, but rather are arranged to partially define a two-vortex chamber within the second core cavity 704. That is, the central ridges 742, 744 are arranged to aid in the formation of the dynamic vortices within the radial cooling flow that passes or flows within the second core cavity. Further, the addition of the central ridges 742, 744 enables separation of two separate dynamic vortices within the second core cavity.

Figure 8:
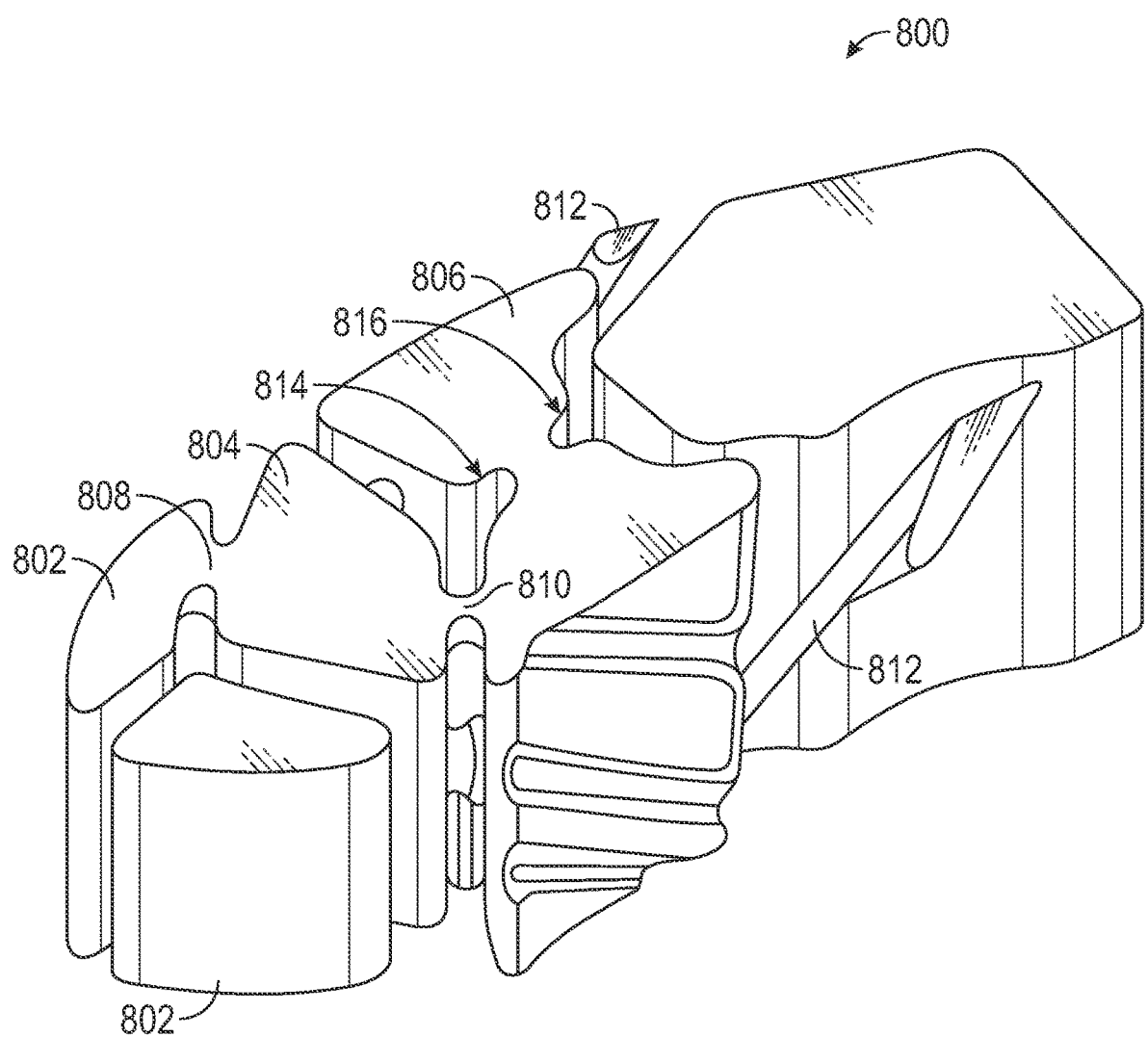
FIG. 8 is a schematic illustration of a portion of a core structure for forming an airfoil in accordance with an embodiment of the present disclosure.

Turning now to FIG. 8, a schematic illustration of a portion of an airfoil core structure 800 in accordance with an embodiment of the present disclosure is shown. The airfoil core structure 8 can be used to manufacture airfoils in accordance with the present disclosure. The airfoil core structure 800 includes two leading edge hybrid cavity cores 802, a first core cavity core 804, and a second core cavity core 806. The leading edge hybrid cavity cores 802 are connected to the forward core cavity core 804 by one or more forward impingement stems 808 that are arranged to form impingement holes between a formed first core cavity (from the first core cavity core 804) and formed leading edge hybrid cavities (from the leading edge hybrid cavity cores 802). Similarly, one or more cavity impingement stems 810 connect the first core cavity core 804 with the second core cavity core 806 to form impingement holes between a formed first core cavity and a formed second core cavity, as shown and described above.

The first core cavity core 804 is arranged with a geometry to form a first cavity wall of a formed second core cavity with a first surface and a second surface, as shown and described above. The first and second surfaces are arranged with the cavity impingement stems 810 to connect with the second core cavity core 806. Extending from or attached to the second core cavity core 806 are one or more film exit stems 812 that are arranged to form the film exits as shown and described above. As shown, the second core cavity core 806 includes a forward central channel 814 and an aft central channel 816 that are arranged to form forward and aft ridges, respectively, as shown and described with respect to FIG. 7.

Although FIGS. 7-8 are illustrated with two central ridges (or associated central channels in a core body), various embodiment may be formed alternatively. For example, in some embodiment, only one of the forward and second cavity walls may include the central ridge, rather than both of the forward and second cavity walls.

Figure 9:
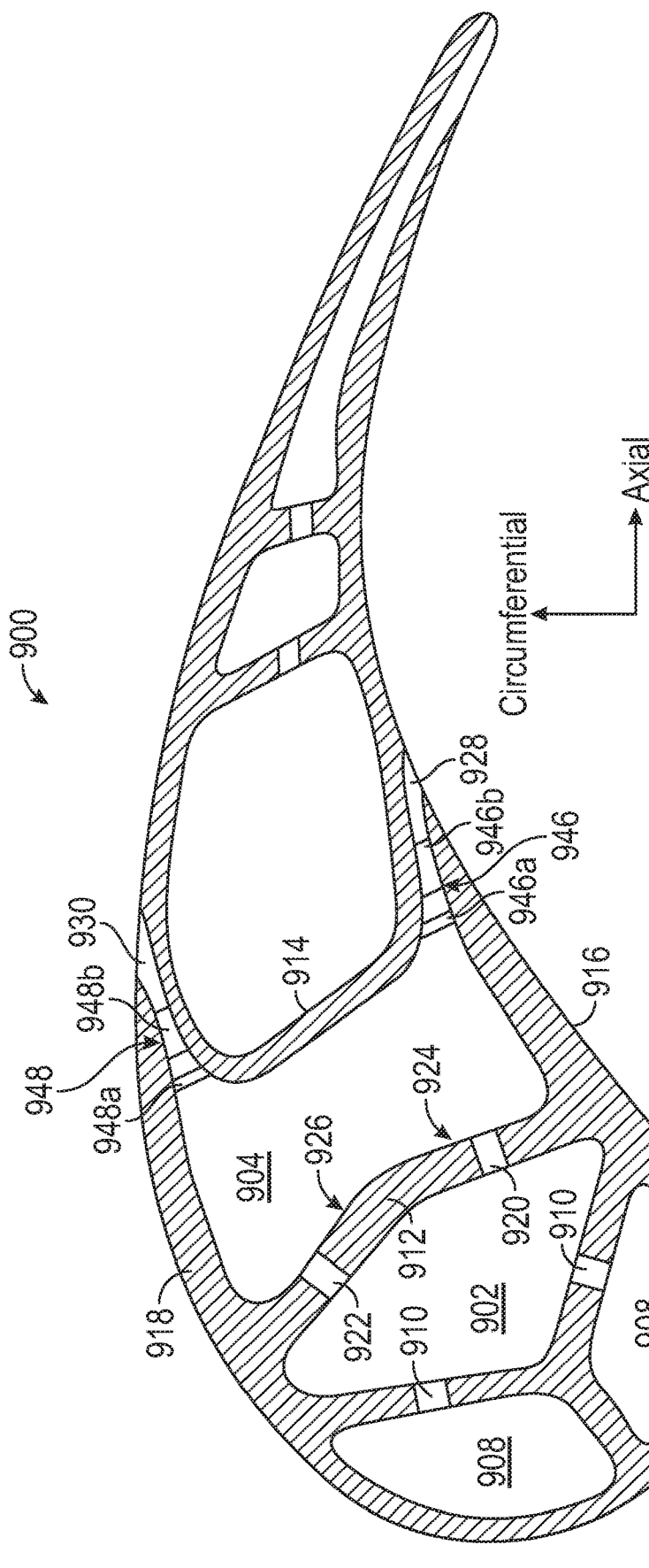
FIG. 9 is a schematic illustration of a cross-section of an airfoil in accordance with an embodiment of the present disclosure.

Turning now to FIG. 9, a schematic illustration of an airfoil 900 in accordance with an embodiment of the present disclosure is shown. The airfoil 900 includes a first core cavity 902 and a second core cavity 904 having an arrangement similar to that described above, wherein side cooling flows are generated by airflow that flows from the first core cavity 902 along interior side walls of the second core cavity 904 and then is expelled out of the airfoil 900.

As shown, the interior of the airfoil 900, at a leading edge 906, is divided into multiple leading edge hybrid cavities 908. The leading edge hybrid cavities 908 are arranged as leading-edge impingement cavities that are supplied with impingement air from the first core cavity 902 through one or more forward impingement holes 910. The leading edge hybrid cavities 908 are fed from the first core cavity 902, which may be a leading edge feed cavity which also feeds the second core cavity 904, in a manner similar to that described above.

The second core cavity 904 is defined in an axial direction between a first cavity wall 912 and a second cavity wall 914. In a circumferential direction, the second core cavity 904 is defined by a first exterior wall 916 and an opposing second exterior wall 918. As discussed above, the exterior walls 916, 918 of the second core cavity 904 are "hot" walls that are exposed to hot gaspath air, and the first cavity wall 912 and the second cavity wall 914 are "cold" walls that are not exposed to the hot gaspath air (i.e., they are internal walls). The first cavity wall 912 includes one or more cavity impingement holes 920, 922. A first set of cavity impingement holes 920 is positioned and oriented within the first cavity wall 912 to direct an aft-flowing impingement flow from the first core cavity 902 into the second core cavity 904 and at the first exterior side wall 916. A second set of cavity impingement holes 922 is positioned and oriented within the first cavity wall 912 to direct an aft-flowing impingement flow from the first core cavity 902 into the second core cavity 904 and at the second exterior side wall 918.

As shown, part of the directing of the impinging flow from the first core cavity 902 to the second core cavity 904 is achieved by the first cavity wall 912 being contoured or shaped. In the present embodiment, the first cavity wall 912 has a first surface 924 that is angled or faces the first exterior wall 916. Similarly, the first cavity wall 912 has a second surface 926 that is angled or faces the second exterior wall 918. In addition to the first cavity wall 912 having angled surfaces 924, 926, in some embodiments, the cavity impingement holes 920, 922 may be angled such that the air is forced to impinge upon the exterior walls 916, 918 of the second core cavity 908. After the air from the first core cavity 902 impinges upon the exterior walls 916, 918 at least a portion of the air will form a high momentum jet along the exterior walls 916, 918 and flow out of the second core cavity 904 through film exits 928, 930. For example, air flowing through the first cavity impingement hole 920 will contact the interior surface of the first exterior wall 916 and run along the first exterior wall 916 to one or more first film exits 928, where the air will exit the interior of the airfoil 900 and flow along and exterior surface of the airfoil 900 (e.g., along a pressure side exterior surface). Similarly, air flowing through the second cavity impingement hole 922 will contact the interior surface of the second exterior wall 918 and run along the second exterior wall 918 to one or more second film exits 930, where the air will exit the interior of the airfoil 900 and flow along and exterior surface of the airfoil 900 (e.g., along a suction side exterior surface). The flow of the impingement air along the exterior walls 916, 918 causes a dead zone to form within the middle of the second core cavity 904, as shown and described above.

In the airfoil 900 shown in FIG. 9, the first and second film exits 928, 930 are formed as circuit exits 946, 948, respectively. That is, in prior embodiments, as illustratively shown, the film exits have been formed as film holes (e.g., discrete exits). However, in this embodiment, an exit gap or channel can be formed, and in some embodiments, heat transfer augmentation features 946a, 946b, 948a, 948b can be provided along the length of the film exits 928, 930 prior to exiting the airfoil. The heat transfer augmentation features 946a, 946b, 948a, 948b can be pedestals, tear drops, racetracks, or other types of heat transfer augmentation features as appreciated by those of skill in the art. Further, such increased size film exits 928, 930 can allow for more of the impinged air (e.g., side cooling flows) to flow directly along the side walls and provided cooling thereto, while reducing an amount of cold air in the vortexes within the second core cavity 904.

Figure 10:
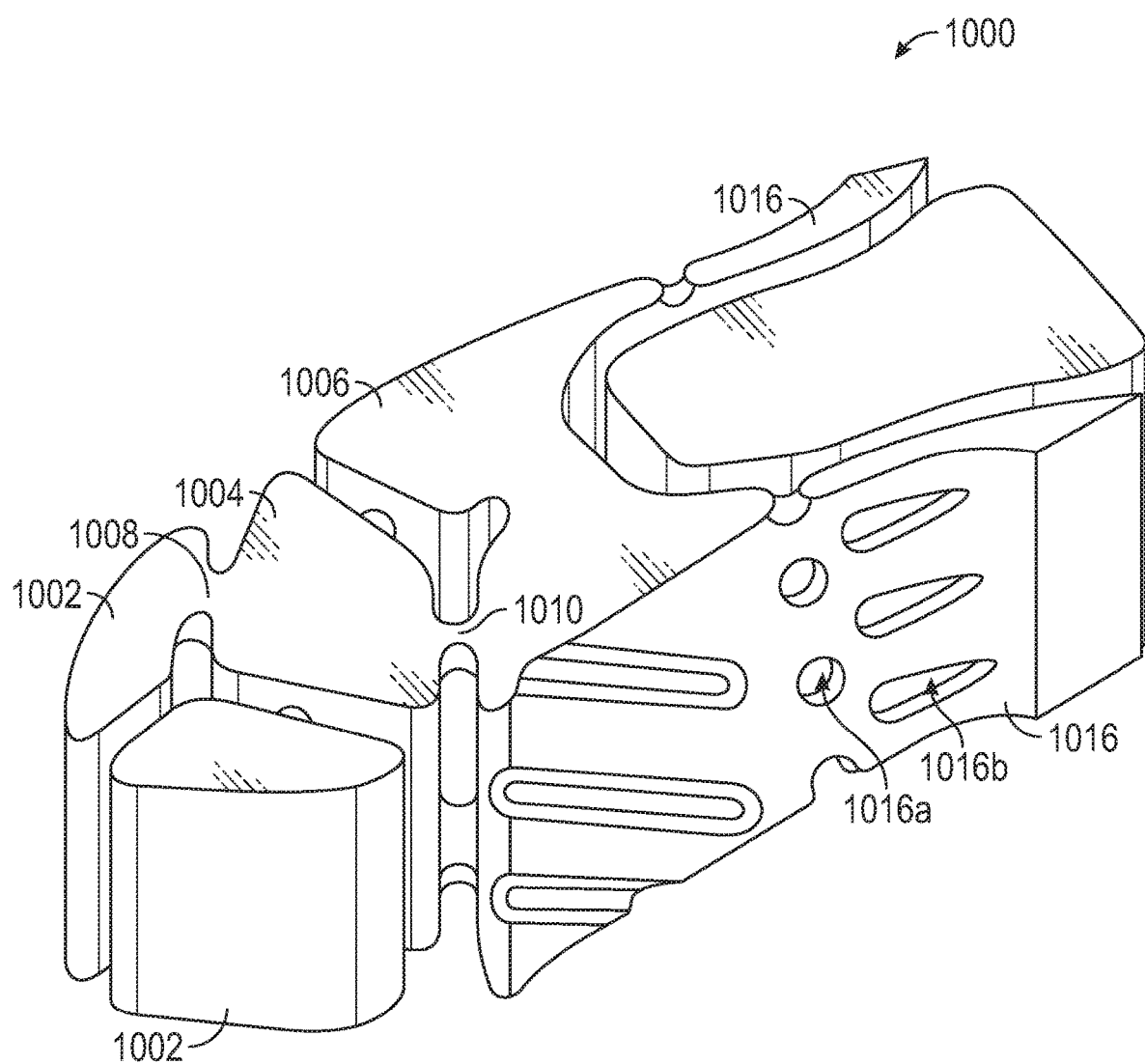
FIG. 10 is a schematic illustration of a portion of a core structure for forming an airfoil in accordance with an embodiment of the present disclosure.

Turning now to FIG. 10, a schematic illustration of a portion of an airfoil core structure 1000 in accordance with an embodiment of the present disclosure is shown. The airfoil core structure 1000 can be used to manufacture airfoils in accordance with the present disclosure. The airfoil core structure 1000 includes two leading edge hybrid cavity cores 1002, a first core cavity core 1004, and a second core cavity core 1006. The leading edge hybrid cavity cores 1002 are connected to the forward core cavity core 1004 by one or more forward impingement stems 1008 that are arranged to form impingement holes between a formed first core cavity (from the first core cavity core 1004) and formed leading edge hybrid cavities (from the leading edge hybrid cavity cores 1002). Similarly, one or more cavity impingement stems 1010 connect the first core cavity core 1004 with the second core cavity core 1006 to form impingement holes between a formed first core cavity and a formed second core cavity, as shown and described above.

The first core cavity core 1004 is arranged with a geometry to form a first cavity wall of a formed second core cavity with a first surface and a second surface, as shown and described above. The first and second surfaces are arranged with the cavity impingement stems 1010 to connect with the second core cavity core 1006. Extending from or attached to the second core cavity core 1006 are one or more film exit cores 1016 that are arranged to form the film exits as shown and described above with respect to FIG. 9. For example, as shown, the film exit core 1016 includes first and second heat transfer augmentation core features 1016a, 1016b to form various heat transfer augmentation features within a film exit (e.g., film exits 928, 930 shown in FIG. 9). The film exit core 1016, as shown, also defines a continuous structure for forming an exit line or gap that will be formed on an exterior surface of a formed airfoil.

Figure 11:
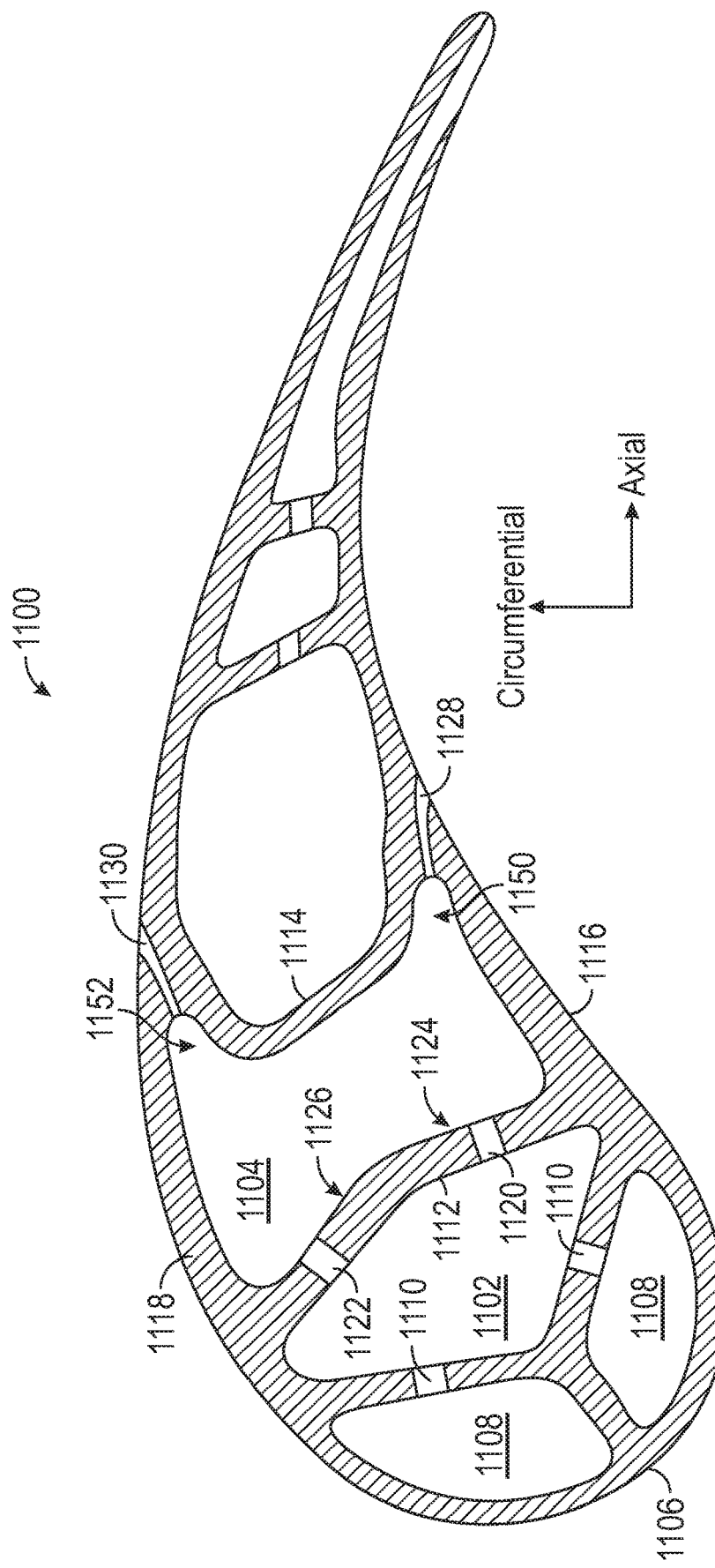
FIG. 11 is a schematic illustration of a cross-section of an airfoil in accordance with an embodiment of the present disclosure.

Turning now to FIG. 11, a schematic illustration of an airfoil 1100 in accordance with an embodiment of the present disclosure is shown. The airfoil 1100 includes a first core cavity 1102 and a second core cavity 1104 having an arrangement similar to that described above, wherein side cooling flows are generated by airflow that flows from the first core cavity 1102 along interior side walls of the second core cavity 1104 and then is expelled out of the airfoil 1100.

As shown, the interior of the airfoil 1100, at a leading edge 1106, is divided into multiple leading edge hybrid cavities 1108. The leading edge hybrid cavities 1108 are arranged as leading-edge impingement cavities that are supplied with impingement air from the first core cavity 1102 through one or more forward impingement holes 1110. The leading edge hybrid cavities 1108 are fed from the first core cavity 1102, which may be a leading edge feed cavity which also feeds the second core cavity 1104, in a manner similar to that described above.

The second core cavity 1104 is defined in an axial direction between a first cavity wall 1112 and a second cavity wall 1114. In a circumferential direction, the second core cavity 1104 is defined by a first exterior wall 1116 and an opposing second exterior wall 1118. As discussed above, the exterior walls 1116, 1118 of the second core cavity 1104 are "hot" walls that are exposed to hot gaspath air, and the first cavity wall 1112 and the second cavity wall 1114 are "cold" walls that are not exposed to the hot gaspath air (i.e., they are internal walls). The first cavity wall 1112 includes one or more cavity impingement holes 1120, 1122. A first set of cavity impingement holes 1120 is positioned and oriented within the first cavity wall 1112 to direct an aft-flowing impingement flow from the first core cavity 1102 into the second core cavity 1104 and at the first exterior side wall 1116. A second set of cavity impingement holes 1122 is positioned and oriented within the first cavity wall 1112 to direct an aft-flowing impingement flow from the first core cavity 1102 into the second core cavity 1104 and at the second exterior side wall 1118.

As shown, part of the directing of the impinging flow from the first core cavity 1102 to the second core cavity 1104 is achieved by the first cavity wall 1112 being contoured or shaped. In the present embodiment, the first cavity wall 1112 has a first surface 1124 that is angled or faces the first exterior wall 1116. Similarly, the first cavity wall 1112 has a second surface 1126 that is angled or faces the second exterior wall 1118. In addition to the first cavity wall 1112 having angled surfaces 1124, 1126, in some embodiments, the cavity impingement holes 1120, 1122 may be angled such that the air is forced to imping upon the exterior walls 1116, 1118 of the second core cavity 1108. After the air from the first core cavity 1102 impinges upon the exterior walls 1116, 1118 at least a portion of the air will form a high momentum jet along the exterior walls 1116, 1118 and flow out of the second core cavity 1104 through film exits 1128, 1130. For example, air flowing through the first cavity impingement hole 1120 will contact the interior surface of the first exterior wall 1116 and run along the first exterior wall 1116 to one or more first film exits 1128, where the air will exit the interior of the airfoil 1100 and flow along and exterior surface of the airfoil 1100 (e.g., along a pressure side exterior surface). Similarly, air flowing through the second cavity impingement hole 1122 will contact the interior surface of the second exterior wall 1118 and run along the second exterior wall 1118 to one or more second film exits 1130, where the air will exit the interior of the airfoil 1100 and flow along and exterior surface of the airfoil 1100 (e.g., along a suction side exterior surface). The flow of the impingement air along the exterior walls 1116, 1118 causes a dead zone to form within the middle of the second core cavity 1104, as shown and described above.

In the airfoil 1100 shown in FIG. 11, the first and second film exits 1128, 1130 include funneling features 1150, 1152 formed in the second cavity wall 1114 and along the side walls 1116, 1118. The funneling features 1150, 1152 are axial extensions of the second core cavity 1104 that extend along the side walls 1116, 1118. The funneling features 1150, 1152 enable funneling of more air to the film exits 1128, 1130, respectively, as compared to embodiments without such features, and can reduce the size of the dynamic vortices within the second core cavity 1104.

Figure 12:
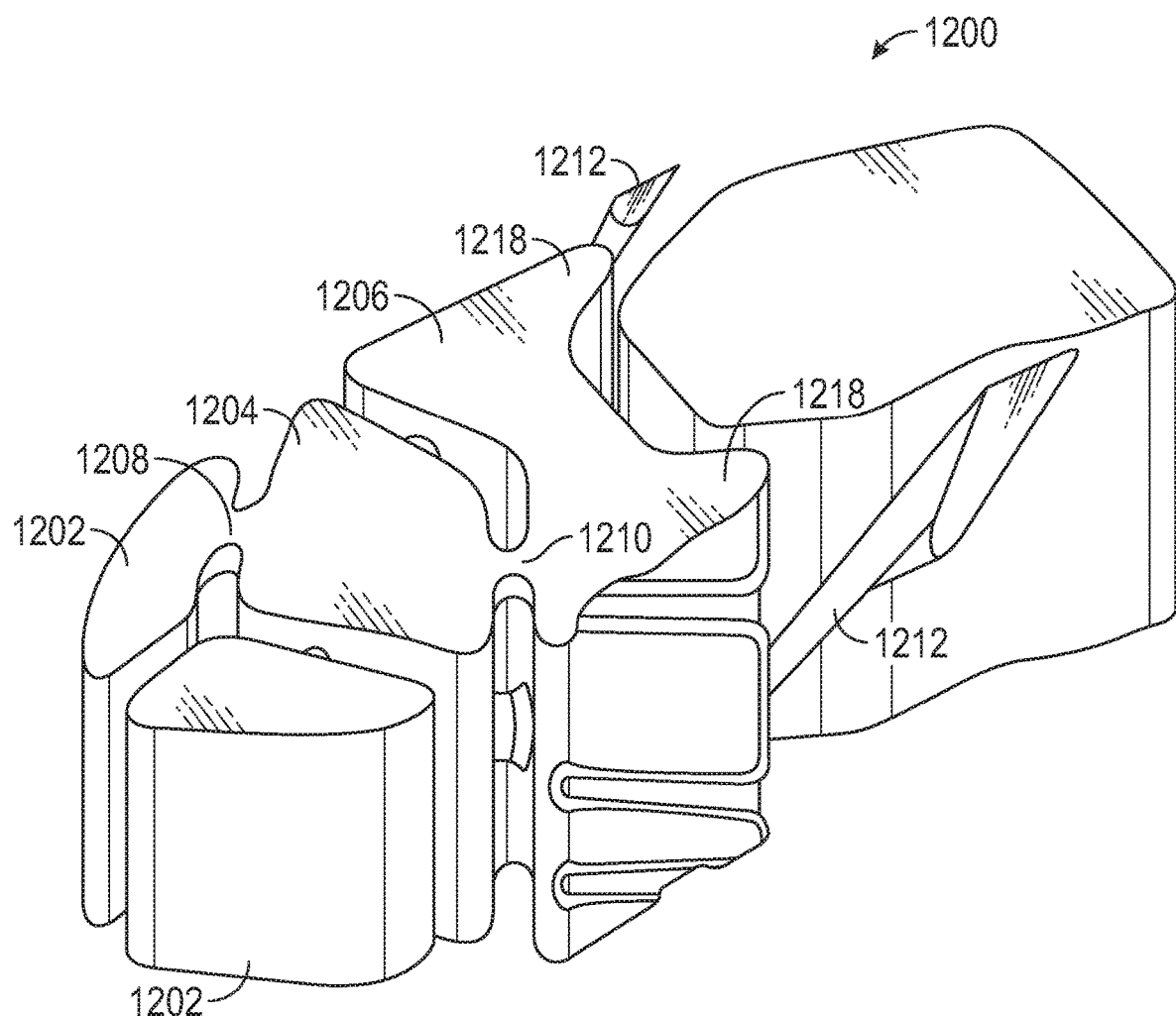
FIG. 12 is a schematic illustration of a portion of a core structure for forming an airfoil in accordance with an embodiment of the present disclosure.

Turning now to FIG. 12, a schematic illustration of a portion of an airfoil core structure 1200 in accordance with an embodiment of the present disclosure is shown. The airfoil core structure 1200 can be used to manufacture airfoils in accordance with the present disclosure. The airfoil core structure 1200 includes two leading edge hybrid cavity cores 1202, a first core cavity core 1204, and a second core cavity core 1206. The leading edge hybrid cavity cores 1202 are connected to the forward core cavity core 1204 by one or more forward impingement stems 1208 that are arranged to form impingement holes between a formed first core cavity (from the first core cavity core 1204) and formed leading edge hybrid cavities (from the leading edge hybrid cavity cores 1202). Similarly, one or more cavity impingement stems 1210 connect the first core cavity core 1204 with the second core cavity core 1206 to form impingement holes between a formed first core cavity and a formed second core cavity, as shown and described above.

The first core cavity core 1204 is arranged with a geometry to form a first cavity wall of a formed second core cavity with a first surface and a second surface, as shown and described above. The first and second surfaces are arranged with the cavity impingement stems 1210 to connect with the second core cavity core 1206. Extending from and integral with the second core cavity core 1206 are funnel feature extensions 1218 that are arranged to form funneling features as shown and described with respect to FIG. 11. To core structure 1200 further includes one or more film exit stems 1212 that are arranged to form the film exits as shown and described above. The film exit stems 1212 extend from the funnel feature extensions 1218.

Figure 13:
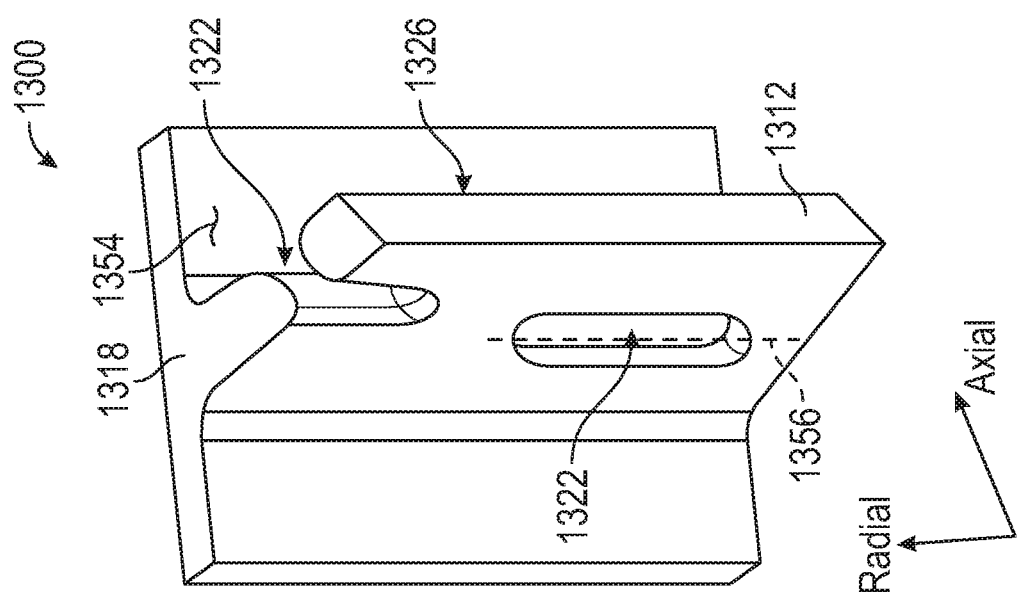
FIG. 13 is a schematic illustration of a portion of an airfoil in accordance with an embodiment of the present disclosure.

Turning now to FIG. 13, a schematic illustration of a portion of an airfoil 1300. The portion shown in FIG. 13 is of an exterior wall 1318 with a first cavity wall 1312 extending therefrom into an interior of the airfoil. The first cavity wall 1312 is substantially similar to that shown and described above and is arranged to separate a first core cavity from a second core cavity. As shown, the first cavity wall 1312 includes a plurality of cavity impingement holes 1322, with the first cavity wall 1312 having a surface 1326 that is angled toward an interior surface 1354 of the exterior side wall 1318. Although in some embodiments, the cavity impingement holes may be circular "holes" other geometries for such impingement passages are possible. For example, in this embodiment, the cavity impingement holes 1322 have radially extending, oblong orientations. This geometry can result in the impingement air being distributed radially along the interior surface 1354 of the exterior side wall 1318. This arrangement can provide for a substantial portion (or all) of the interior surface 1354 to receive impingement air from a first core cavity. As shown, to achieve the orientation shown in FIG. 13, the cavity impingement holes 1322 have an axis 1356 that runs parallel to the radial direction of the airfoil 1300.

Figure 14:
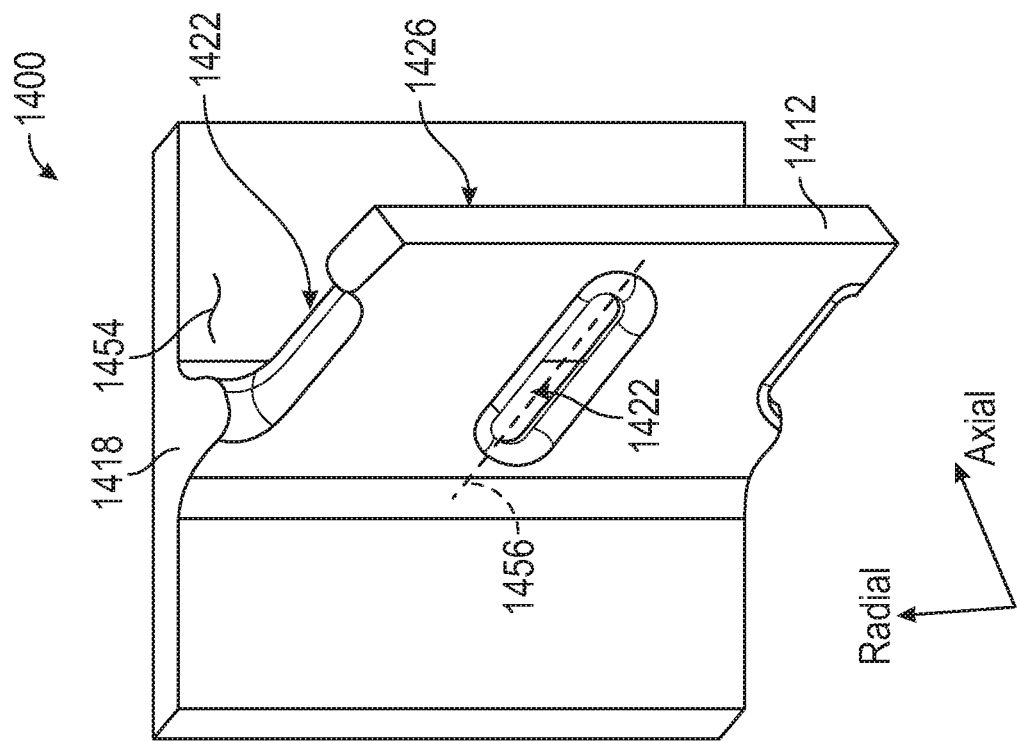
FIG. 14 is a schematic illustration of a portion of an airfoil in accordance with an embodiment of the present disclosure.

Turning now to FIG. 14, a schematic illustration of a portion of an airfoil 1400. The portion shown in FIG. 14 is of an exterior wall 1418 with a first cavity wall 1412 extending therefrom into an interior of the airfoil. The first cavity wall 1412 is substantially similar to that shown and described above and is arranged to separate a first core cavity from a second core cavity. As shown, the first cavity wall 1412 includes a plurality of cavity impingement holes 1422, with the first cavity wall 1412 having a surface 1426 that is angled toward an interior surface 1454 of the exterior side wall 1418. In this embodiment, the cavity impingement holes 1422 have axially extending, oblong orientations along the first cavity wall 1412. In this embodiment, the cavity impingement holes 1422 are axially lengthened such that the impinged air on the interior surface 1454 of the exterior side wall 1418 remains on the interior surface 1454 longer (e.g., in time) regardless of augmentation features such as trip strips or small pin fins formed in or on the interior surface 1454 of the exterior side wall 1418. As shown, to achieve the orientation shown in FIG. 14, the cavity impingement holes 1422 have an axis 1456 that runs perpendicular to the radial direction of the airfoil 1400.

Although FIGS. 13-14 illustrate specific orientations of oblong cavity impingement holes, various other orientations are possible without departing from the scope of the present disclosure. The orientation of FIG. 13 can represent a zero degree angling of the cavity impingement holes relative to the exterior side wall and the orientation of FIG. 14 can represent a 90° angling of the cavity impingement holes relative to the exterior side wall. A 180° angling would appear as the arrangement shown in FIG. 13 (i.e., 0° and 180° appear the same due to the oblong geometry and shape of the cavity impingement holes). In various embodiments, the cavity impingement holes can take any degree of angling relative to the exterior side wall from 0° to 180°. That is, the cavity impingement holes have oblong shapes with a long axis oriented between 0° and 180° relative to the first exterior side wall.

Figure 15:
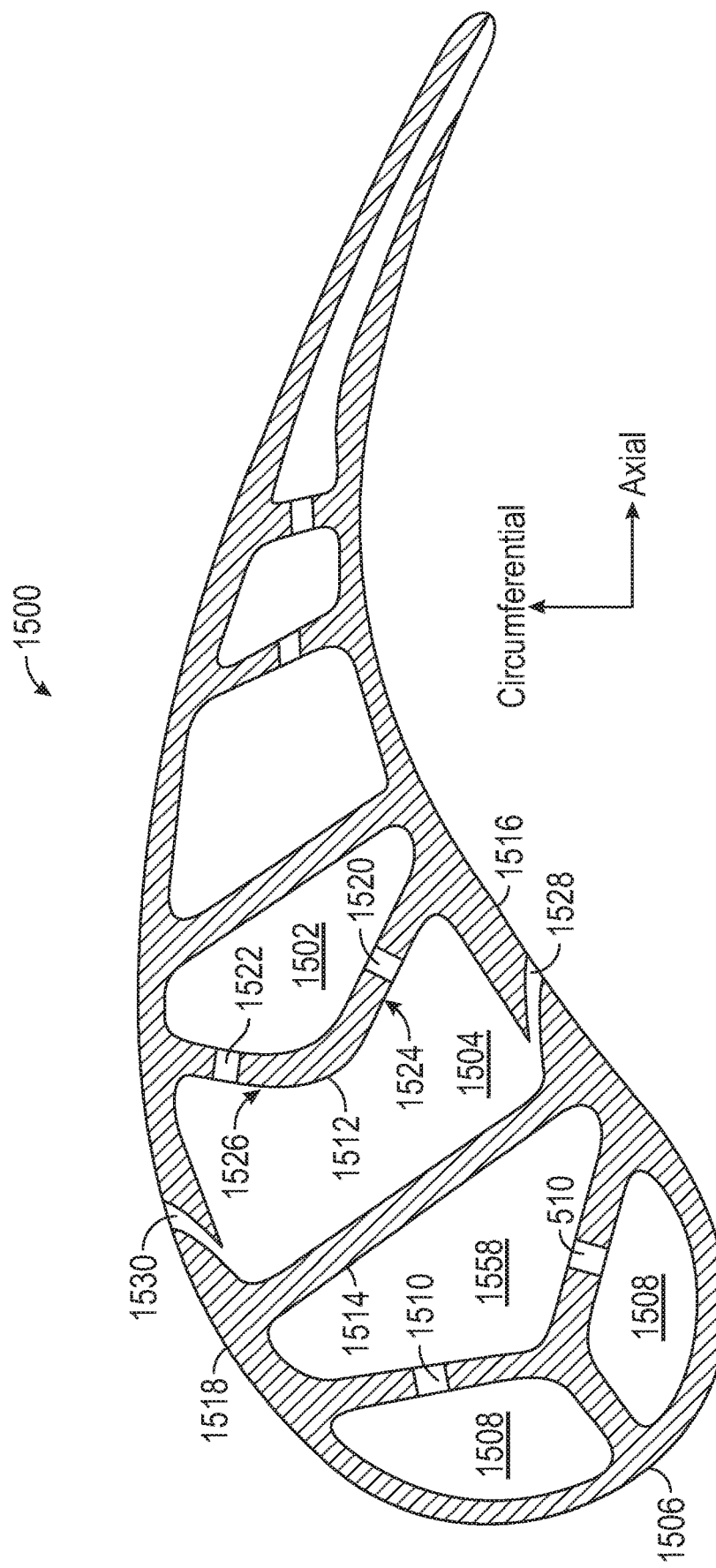
FIG. 15 is a schematic illustration of a cross-section of an airfoil in accordance with an embodiment of the present disclosure.

Turning now to FIG. 15, a schematic illustration of an airfoil 1500 in accordance with an embodiment of the present disclosure is shown. The airfoil 1500 includes a first core cavity 1502 and a second core cavity 1504 having an arrangement different from the above described embodiments. In this embodiment, the first core cavity 1502 is located aft of the second core cavity 1504. However, similar to the above described embodiments, side cooling flows are generated by airflow that flows from the first core cavity 1502 along interior side walls of the second core cavity 1504 and then is expelled out of the airfoil 1500.

As shown, the interior of the airfoil 1500, at a leading edge 1506, is divided into multiple leading edge hybrid cavities 1508. The leading edge hybrid cavities 1508 are arranged as leading-edge impingement cavities that are supplied with impingement air from a leading edge feed cavity 1558 through one or more forward impingement holes 1510. In this embodiment, unlike that described above, the leading edge feed cavity 1558 is not fluidly connected to either of the first or second core cavities 1502, 1504.

The first core cavity 1502, in this embodiment, is a conventional cavity that can be sourced with cooling air from other cavities within the airfoil 1500 and/or from a cooling source that is located at an end of the airfoil body (e.g., at platform ends of a vane or at a root of a blade, depending on the configuration of the airfoil). The second core cavity 1504 is defined in an axial direction between a first cavity wall 1512 and a second cavity wall 1514. In a circumferential direction, the second core cavity 1504 is defined by a first exterior wall 1516 and an opposing second exterior wall 1518. Similar to that described above, the exterior walls 1516, 1518 of the second core cavity 1504 are "hot" walls that are exposed to hot gaspath air, and the first cavity wall 1512 and the second cavity wall 1514 are "cold" walls that are not exposed to the hot gaspath air (i.e., they are internal walls).

The first cavity wall 1512 includes one or more cavity impingement holes 1520, 1522. A first set of cavity impingement holes 1520 is positioned and oriented within the first cavity wall 1512 to direct an aft-flowing impingement flow from the first core cavity 1502 into the second core cavity 1504 and at the first exterior side wall 1516. A second set of cavity impingement holes 1522 is positioned and oriented within the first cavity wall 1512 to direct an aft-flowing impingement flow from the first core cavity 1502 into the second core cavity 1504 and at the second exterior side wall 1518.

As shown, part of the directing of the impinging flow from the first core cavity 1502 to the second core cavity 1504 is achieved by the first cavity wall 1512 being contoured or shaped. In the present embodiment, the first cavity wall 1512 has a first surface 1524 that is angled or faces the first exterior wall 1516. Similarly, the first cavity wall 1512 has a second surface 1526 that is angled or faces the second exterior wall 1518. In addition to the first cavity wall 1512 having angled surfaces 1524, 1526, in some embodiments, the cavity impingement holes 1520, 1522 may be angled such that the air is forced to imping upon the exterior walls 1516, 1518 of the second core cavity 1508. After the air from the first core cavity 1502 impinges upon the exterior walls 1516, 1518 at least a portion of the air will form a high momentum jet along the exterior walls 1516, 1518 and flow out of the second core cavity 1504 through film exits 1528, 1530.

For example, air flowing through the first cavity impingement hole 1520 will contact the interior surface of the first exterior wall 1516 and run in a forward direction along the first exterior wall 1516 to one or more first film exits 1528, where the air will turn and exit the interior of the airfoil 1500 and flow along and exterior surface of the airfoil 1500 (e.g., along a pressure side exterior surface). Similarly, air flowing through the second cavity impingement hole 1522 will contact the interior surface of the second exterior wall 1518 and run in forward direction along the second exterior wall 1518 to one or more second film exits 1530, where the air will exit the interior of the airfoil 1500 and flow along and exterior surface of the airfoil 1500 (e.g., along a suction side exterior surface). The flow of the impingement air along the interior surface of the exterior walls 1516, 1518 within the second core cavity 1504 causes a dead zone to form within the middle of the second core cavity 1504.

Figure 16:
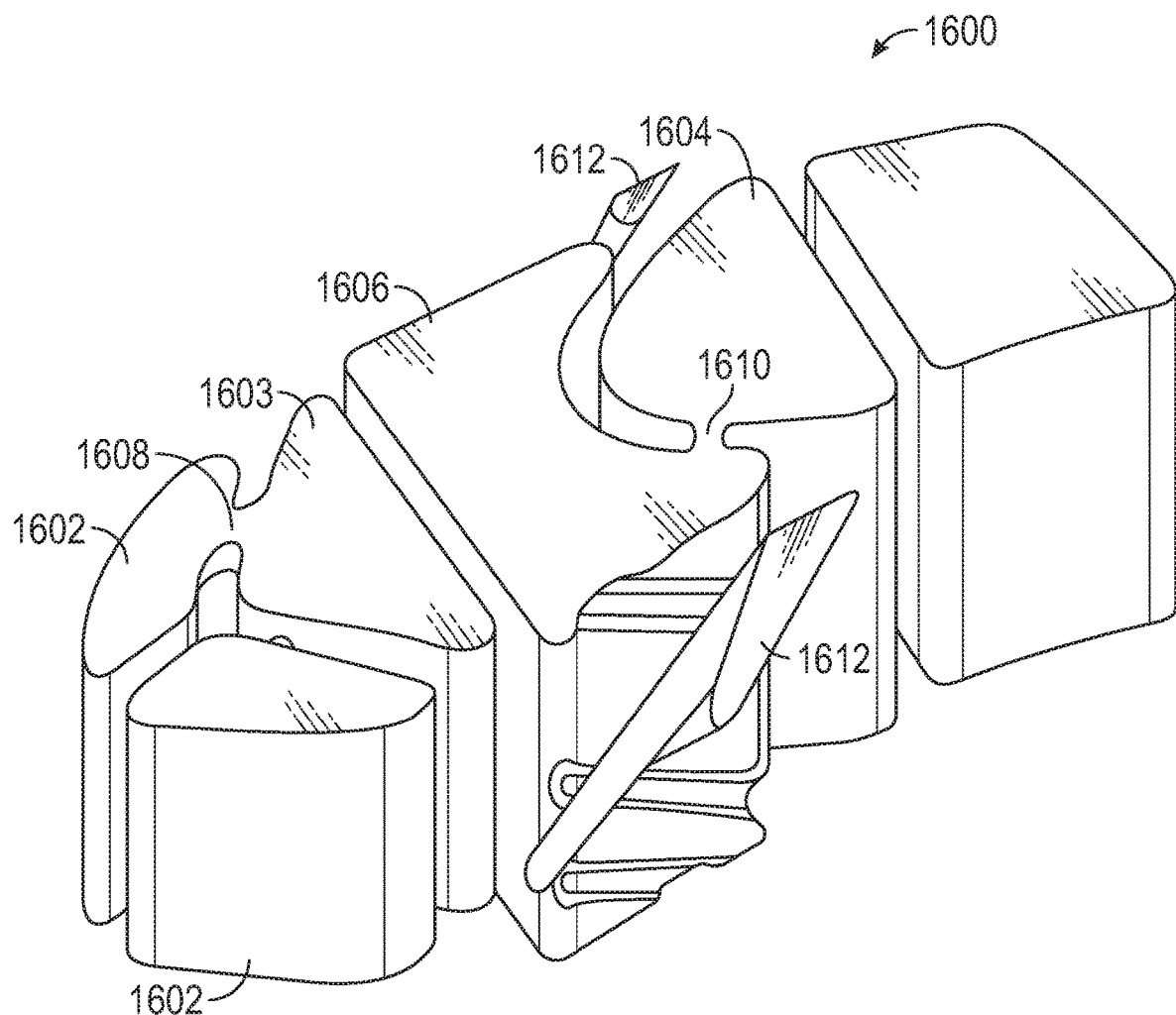
FIG. 16 is a schematic illustration of a portion of a core structure for forming an airfoil in accordance with an embodiment of the present disclosure.

Turning now to FIG. 16, a schematic illustration of a portion of an airfoil core structure 1600 in accordance with an embodiment of the present disclosure is shown. The airfoil core structure 1600 can be used to manufacture airfoils in accordance with the present disclosure. The airfoil core structure 1600 includes two leading edge hybrid cavity cores 1602 and a leading edge feed cavity core 1603. Further, the airfoil core structure 1600 includes a first core cavity core 1604 and a second core cavity core 1606, arranged to form fluidly connected first and second core cavities. The leading edge hybrid cavity cores 1602 are connected to the leading edge feed cavity core 1604 by one or more forward impingement stems 1608 that are arranged to form impingement holes between a formed leading edge feed cavity and formed leading edge hybrid cavities. In contrast to the previously discussed embodiments, one or more cavity impingement stems 1610 connect the first core cavity core 1604 with the second core cavity core 1606 to form impingement holes between a formed first core cavity and a formed second core cavity.

The first core cavity core 1604 is arranged with a geometry to form a first cavity wall of a formed second core cavity with a first surface and a second surface, as shown and described above. The first and second surfaces are arranged with the cavity impingement stems 1610 to connect with the second core cavity core 1606. Extending from and integral with the second core cavity core 1606 one or more film exit stems 1612 that are arranged to form the film exits as shown and described above.

In the above shown embodiments, the cavity impingement holes of the impingement wall are shown as misaligned in the radial direction. That is, the cavity impingement holes in one angled surface of the first cavity wall are located at a different radial position than the cavity impingement holes in the other angled surface of the first cavity wall.

This arrangement is shown, for example, in the arrangement shown in the airfoil core structures of FIGS. 6, 8, 10, 12, and 16. In these illustrations, the cavity impingement stems in one surface are not aligned in the radial direction with the cavity impingement stems of the other surface. In contrast, the cross-sectional illustrations of FIGS. 5A, 7, 9, 11, and 15, the cavity impingement holes are shown at the same radial position (i.e., shown in the cross-sectional slice of the respective airfoils)

Accordingly, in some embodiments, the cavity impingement holes of the impingement wall can be aligned between the two surfaces and in other embodiments, the cavity impingement holes may be misaligned in the radial direction. For example, when aligned, the impinging air flowing through a first cavity impingement hole in a first surface of the impingement wall can impact the first exterior wall at the same airfoil radial position (e.g., height within the airfoil) as the impinging air flowing through a second cavity impingement hole in a second surface of the impingement wall and impinging upon the second exterior wall. That is, the arrays of cavity impingement holes can have an aligned pattern. However, in other embodiments, radial staggering, misalignment, or offset of the impingement holes within the two surfaces of the impingement wall may be employed. The arrangement of the cavity impingement holes (e.g., staggered or aligned) may alter the nature of the dynamic vortices within the second core cavity. For example, an aligned configuration may result in a stable or relatively linear separation between the two vortices. In contrast, a staggered arrangement may result in a wavy or possibly turbulent interaction between neighboring dynamic vortices. Accordingly, vortex pressures may vary depending on the arrangement and configuration and/or angle of orientation and may result in different hot wall cooling stream behavior.

Figure 17:
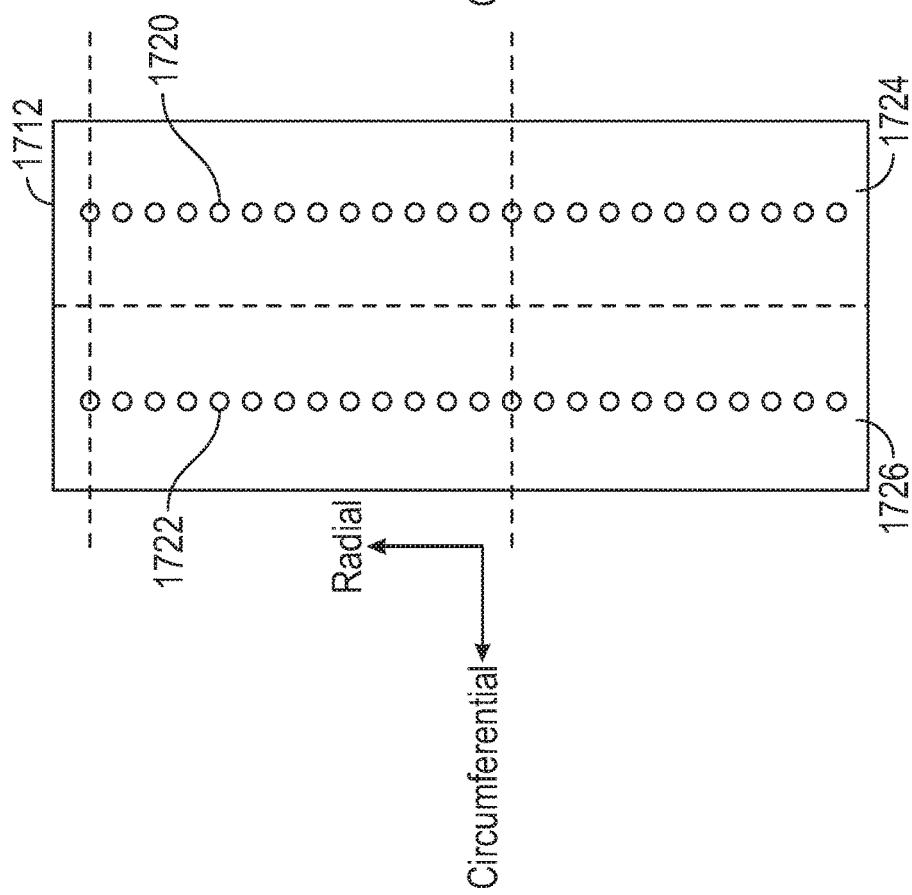
FIG. 17 is an elevation view of a cavity wall in accordance with an embodiment of the present disclosure illustrating an impingement hole configuration.

Turning to FIG. 17, a schematic illustration of a first cavity wall 1712 having a plurality of cavity impingement holes 1720, 1722 is shown. A first set of cavity impingement holes 1720 is shown formed in a first angled surface 1724 of the first cavity wall 1712 and a second set of cavity impingement holes 1722 is shown formed in a second angled surface 1726 of the first cavity wall 1712. As illustratively shown, the impingement holes of the first set of cavity impingement holes 1720 are aligned in a radial direction with the impingement holes of the second set of cavity impingement holes 1722.

Figure 18:
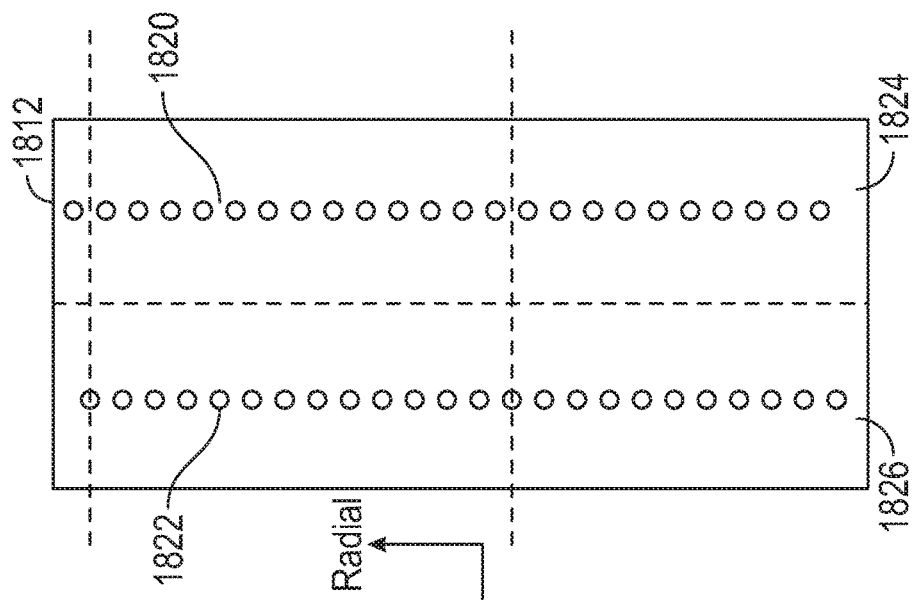
FIG. 18 is an elevation view of a cavity wall in accordance with an embodiment of the present disclosure illustrating an impingement hole configuration.

Turning to FIG. 18, a schematic illustration of a first cavity wall 1812 having a plurality of cavity impingement holes 1820, 1822 is shown. A first set of cavity impingement holes 1820 is shown formed in a first angled surface 1824 of the first cavity wall 1812 and a second set of cavity impingement holes 1822 is shown formed in a second angled surface 1826 of the first cavity wall 1812. As illustratively shown, the impingement holes of the first set of cavity impingement holes 1820 are offset in a radial direction from the impingement holes of the second set of cavity impingement holes 1822.

Figure 19:
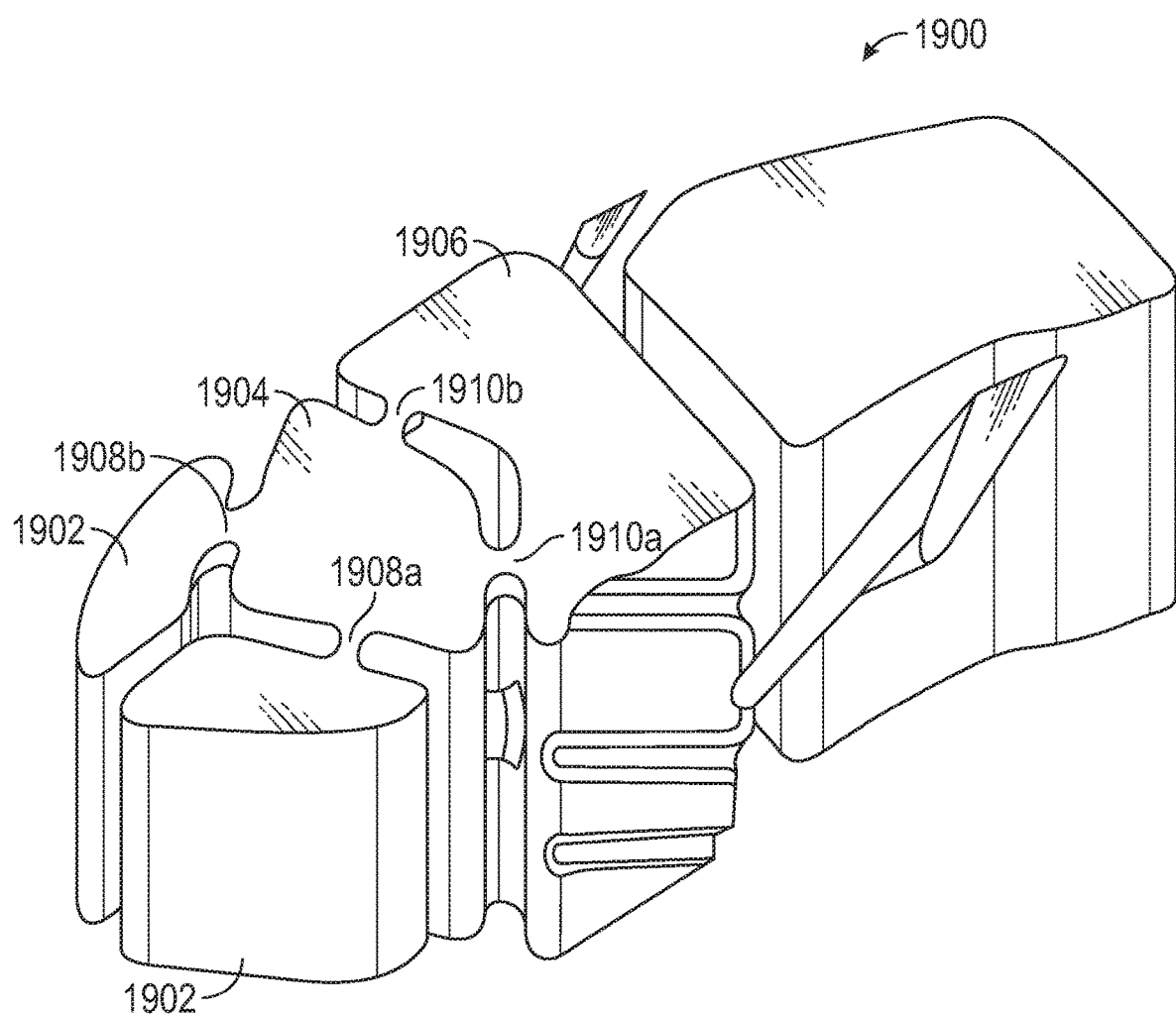
FIG. 19 is a schematic illustration of a portion of a core structure for forming an airfoil in accordance with an embodiment of the present disclosure.

Turning now to FIG. 19, a schematic illustration of an airfoil core structure 1900 in accordance with an embodiment of the present disclosure is shown. The airfoil core structure 1900 can be used to manufacture airfoils in accordance with the present disclosure. The airfoil core structure 1900 includes two leading edge hybrid cavity cores 1902, a first core cavity core 1904 (forming, in part, a leading edge feed cavity core), and a second core cavity core 1906, arranged to form fluidly connected first and second core cavities. The leading edge hybrid cavity cores 1902 are connected to the leading edge feed cavity core 1904 by one or more radially aligned forward impingement stems 1908*a*, 1908*b* that are arranged to form aligned impingement holes in a radial direction between a formed leading edge feed cavity and formed leading edge hybrid cavities. The aligned forward impingement stems 1908*a*, 1908*b* are arranged to form aligned impingement holes, e.g., impingement holes located at similar radial positions, for each of the leading edge hybrid cavities. Similarly, one or more aligned (in a radial direction) cavity impingement stems 1910*a*, 1910*b* connect the first core cavity core 1904 with the second core cavity core 1906 to form radially aligned impingement holes between a formed first core cavity and a formed second core cavity that are aligned at radial positions in a formed airfoil. This arrangement is in contrast to the structures of the airfoil core structures of FIGS. 6, 8, 10, and 12, which all shown unaligned or offset forward impingement stems and unaligned or offset cavity impingement stems.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

Advantageously, embodiments provided herein are directed to airfoil cooling cavity structures that combine the benefits of hybrid cavities and traditional core cavities. Further, advantageously, improved part life, improved cooling, and reduced weight can all be achieved from embodiments of the present disclosure.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A core structure for manufacturing an airfoil for a gas turbine engine, the core structure comprising:
 a first core cavity core to form a first core cavity in the manufactured airfoil; and
 a second core cavity core to form a second core cavity in the manufactured airfoil, the second core cavity core located adj acent the first core cavity core, wherein the second core cavity core is arranged to form a first cavity wall, a second cavity wall opposing the first cavity wall, a first exterior wall, and a second exterior wall opposing the first exterior wall in the manufactured airfoil such that the first cavity wall is formed between the second core cavity core and the first core cavity core and the first and second exterior walls are exterior walls of the formed airfoil;
 wherein a space between the first core cavity core and the second core cavity core that defines the formed first cavity wall includes a first portion to form a first surface of the first cavity wall that is angled toward the formed first exterior wall and a second portion to form a second surface of the first cavity wall that is angled toward the formed second exterior wall, wherein the space between the first core cavity core and the second core cavity core has a chevron shape;
 at least one first cavity impingement stem spanning the space between the first core cavity core and the second core cavity core and extending between the first core cavity core and the second core cavity core, wherein a first cavity impingement hole is formed by each first cavity impingement stem in the formed airfoil such that cooling flow can flow from the first core cavity through the at least one first cavity impingement hole and impinge upon the first exterior wall of the formed airfoil to form a first high momentum jet of impingement air thereon;
 at least one second cavity impingement stem spanning the space between the first core cavity core and the second core cavity core and extending between the first core cavity core and the second core cavity core, wherein a second cavity impingement hole is formed by each second cavity impingement stem in the formed airfoil such that cooling flow can flow from the first core cavity through the at least one second cavity impingement hole and impinge upon the second exterior wall of the formed airfoil to form a second high momentum jet thereon; and
 a forward central channel formed in the second core cavity core extending into the second core cavity core to form a forward central ridge on of the first cavity wall of the formed airfoil; and
 an aft central channel formed in the second core cavity core extending into the second core cavity core to form an aft central ridge on the second cavity wall of the formed airfoil,
 wherein the forward central ridge and the after central ridge at least partially divide the second core cavity into a two-vortex chamber.

2. The core structure of claim 1, further comprising at least one film exit stem attached to the second core cavity core to form at least one film exit in the first exterior wall, the at least one film exit arranged to expel air from the second core cavity through the first exterior wall in the formed airfoil body.

3. The core structure of claim 2, wherein the at least one formed film exit is arranged to pull the impingement air from the at least one first cavity impingement hole along an interior surface of the first exterior wall within the second core cavity of the formed airfoil.

4. The core structure of claim 1, further comprising at least one film exit core attached to the second core cavity core to form at least one circuit exit in the first exterior wall, the at least one circuit exit arranged to expel air from the second core cavity through the first exterior wall in the formed airfoil body.

5. The core structure of claim 4, wherein the at least one film exit core includes one or more heat transfer augmentation core features therein to form heat transfer augmentation features in the at least one circuit exit.

6. The core structure of claim 1, further comprising a funnel feature extension extending from the second core cavity core in an aftward direction to form a funneling feature in a formed airfoil.

7. The core structure of claim 1, wherein the at least one first cavity impingement stem is oblong in shape and has a radial orientation.

8. The core structure of claim 1, wherein the at least one first cavity impingement stem is oblong in shape and has an axial orientation.

9. The core structure of claim 1, wherein the at least one first cavity impingement stem is oblong in shape and has an angular orientation.

* * * * *